(12) United States Patent
Zou et al.

(10) Patent No.: US 10,634,894 B2
(45) Date of Patent: Apr. 28, 2020

(54) REAL-TIME FOCUSING IN LINE SCAN IMAGING

(71) Applicant: LEICA BIOSYSTEMS IMAGING, INC., Vista, CA (US)

(72) Inventors: Yunlu Zou, San Diego, CA (US); Allen Olson, San Diego, CA (US); Kiran Saligrama, San Diego, CA (US); Ruby Chen, Oceanside, CA (US); Peyman Najmabadi, San Diego, CA (US); Greg Crandall, San Marcos, CA (US)

(73) Assignee: LEICA BIOSYSTEMS IMAGING, INC., Vista, CA (US)

( * ) Notice: Subject to any disclaimer, the term of this patent is extended or adjusted under 35 U.S.C. 154(b) by 0 days.

(21) Appl. No.: 15/763,061

(22) PCT Filed: Sep. 23, 2016

(86) PCT No.: PCT/US2016/053581
§ 371 (c)(1),
(2) Date: Mar. 23, 2018

(87) PCT Pub. No.: WO2017/053891
PCT Pub. Date: Mar. 30, 2017

(65) Prior Publication Data
US 2018/0275388 A1 Sep. 27, 2018

Related U.S. Application Data

(60) Provisional application No. 62/232,229, filed on Sep. 24, 2015.

(51) Int. Cl.
*G02B 21/24* (2006.01)
*G02B 21/36* (2006.01)
(Continued)

(52) U.S. Cl.
CPC ........... *G02B 21/244* (2013.01); *G02B 21/02* (2013.01); *G02B 21/18* (2013.01); *G02B 21/245* (2013.01);
(Continued)

(58) Field of Classification Search
CPC ..... H04N 5/23212; G02B 21/361; G02B 7/28
See application file for complete search history.

(56) References Cited

U.S. PATENT DOCUMENTS 3,967,110 A * 6/1976 Rogers ............... G01N 15/1468
250/201.4
4,636,627 A 1/1987 Matsumura
(Continued)

FOREIGN PATENT DOCUMENTS

CN 101558430 A 10/2009
DE 10127284 A1 12/2002
(Continued)

OTHER PUBLICATIONS

International Search Report and Written Opinion for related International Application No. PCT/US2016/053581 dated Dec. 6, 2016, in 10 pages.
(Continued)

*Primary Examiner* — Mainul Hasan
(74) *Attorney, Agent, or Firm* — Procopio, Cory, Hargreaves & Savitch LLP

(57) ABSTRACT

System for acquiring a digital image of a sample on a microscope slide. In an embodiment, the system comprises a stage configured to support a sample, an objective lens having a single optical axis that is orthogonal to the stage, an imaging sensor, and a focusing sensor. The system further comprises at least one beam splitter optically coupled to the objective lens and configured to receive a field of view corresponding to the optical axis of the objective lens, and
(Continued)

simultaneously provide at least a first portion of the field of view to the imaging sensor and at least a second portion of the field of view to the focusing sensor. The focusing sensor may simultaneously acquire image(s) at a plurality of different focal distances and/or simultaneously acquire a pair of mirrored images, each comprising pixels acquired at a plurality of different focal distances.

20 Claims, 20 Drawing Sheets

(51) Int. Cl.
  *G02B 21/02* (2006.01)
  *G02B 21/18* (2006.01)
  *G02B 21/26* (2006.01)
  *G02B 21/34* (2006.01)
  *H04N 5/232* (2006.01)

(52) U.S. Cl.
  CPC ............ *G02B 21/26* (2013.01); *G02B 21/34* (2013.01); *G02B 21/361* (2013.01); *H04N 5/23212* (2013.01)

(56) References Cited

U.S. PATENT DOCUMENTS

| | | | |
|---|---|---|---|
| 5,756,307 A | 5/1998 | Uhl et al. | |
| 6,091,075 A | 7/2000 | Shibata et al. | |
| 6,640,014 B1* | 10/2003 | Price | G02B 21/241 358/408 |
| 6,724,489 B2 | 4/2004 | Freifeld | |
| 6,760,154 B1 | 7/2004 | Focht | |
| 6,825,454 B2 | 11/2004 | Czarnetzki et al. | |
| 7,071,451 B2 | 7/2006 | Ishikawa et al. | |
| 7,232,980 B2 | 6/2007 | Oshiro et al. | |
| 7,330,574 B2 | 2/2008 | Olszak | |
| 7,576,307 B2 | 8/2009 | Yazdanfar et al. | |
| 7,719,598 B2 | 5/2010 | Ortyn et al. | |
| 7,813,579 B2 | 10/2010 | Oshiro et al. | |
| 7,889,263 B2 | 2/2011 | Ortyn et al. | |
| 8,027,548 B2 | 9/2011 | Oshiro et al. | |
| 8,175,452 B1 | 5/2012 | Staker et al. | |
| 8,184,920 B2 | 5/2012 | Oshiro et al. | |
| 8,304,704 B2 | 11/2012 | Hing et al. | |
| 8,379,136 B2 | 2/2013 | Ortyn et al. | |
| 8,428,454 B2 | 4/2013 | Staker et al. | |
| 8,878,923 B2 | 11/2014 | Henderson et al. | |
| 9,036,255 B2 | 5/2015 | Loney et al. | |
| 9,113,091 B2 | 8/2015 | Bishop et al. | |
| 9,116,035 B2 | 8/2015 | Gouch et al. | |
| 9,229,211 B2 | 1/2016 | Yamamoto | |
| 9,841,590 B2 | 12/2017 | Zou et al. | |
| 2002/0044346 A1 | 4/2002 | Nguyen et al. | |
| 2004/0129858 A1 | 7/2004 | Czarnetzki et al. | |
| 2005/0089208 A1 | 4/2005 | Dong et al. | |
| 2005/0105174 A1* | 5/2005 | Ogihara | G03B 7/099 359/383 |
| 2005/0258335 A1 | 11/2005 | Oshiro et al. | |
| 2005/0270611 A1* | 12/2005 | Oshiro | G02B 21/244 713/186 |
| 2006/0060781 A1 | 3/2006 | Watanabe et al. | |
| 2007/0034773 A1 | 2/2007 | Amar et al. | |
| 2007/0102620 A1 | 5/2007 | Bublitz et al. | |
| 2007/0147673 A1 | 6/2007 | Crandall | |
| 2007/0159687 A1 | 7/2007 | Tohma et al. | |
| 2008/0137938 A1* | 6/2008 | Zahniser | G02B 21/244 382/133 |
| 2008/0266440 A1 | 10/2008 | Yazdanfar et al. | |
| 2009/0295963 A1 | 12/2009 | Bamford et al. | |
| 2012/0050562 A1 | 3/2012 | Perwass et al. | |
| 2012/0287256 A1 | 11/2012 | Hulsken et al. | |
| 2013/0057674 A1 | 3/2013 | Hulsken et al. | |
| 2013/0093874 A1 | 4/2013 | Hulsken et al. | |
| 2014/0125776 A1 | 5/2014 | Damaskinos et al. | |
| 2014/0168640 A1 | 6/2014 | Gouch | |
| 2014/0231638 A1 | 8/2014 | Damaskinos et al. | |
| 2014/0267673 A1 | 9/2014 | Yamamoto et al. | |
| 2015/0116475 A1 | 4/2015 | Oishi | |
| 2015/0153555 A1 | 6/2015 | Loney et al. | |
| 2015/0156396 A1 | 6/2015 | Oishi | |
| 2015/0156397 A1 | 6/2015 | Oishi | |
| 2015/0163394 A1 | 6/2015 | Tsai et al. | |
| 2016/0142617 A1 | 5/2016 | Oishi et al. | |
| 2016/0156832 A1 | 6/2016 | Oishi et al. | |

FOREIGN PATENT DOCUMENTS

| | | |
|---|---|---|
| DE | 102007017598 A1 | 10/2008 |
| JP | H08320430 A | 12/1996 |
| JP | 11052224 A | 2/1999 |
| JP | 2004046132 A | 2/2004 |
| JP | 2005070225 A | 3/2005 |
| JP | 2007327891 A | 12/2007 |
| WO | 2004097493 A1 | 11/2004 |
| WO | 2005010495 A2 | 2/2005 |
| WO | 2005114287 A1 | 12/2005 |
| WO | 2010067256 A1 | 6/2010 |
| WO | 2011145016 A1 | 11/2011 |
| WO | 2011161594 A1 | 12/2011 |
| WO | 2013017855 A1 | 2/2013 |
| WO | 2013040686 A1 | 3/2013 |
| WO | 2013/165576 A1 | 11/2013 |
| WO | WO-2013165576 A1 * | 11/2013 |
| WO | 2014174919 A1 | 10/2014 |
| WO | 2014199685 A1 | 12/2014 |

OTHER PUBLICATIONS

Communication pursuant to Rule 164(1) EPC dated Apr. 17, 2019 for related European Patent Application No. 16849812.9, in 15 pages.
International search report dated Jun. 21, 2013 issued for International application No. PCT/US2013/031045, in 11 pages.
Extended European Search Report dated Jan. 26, 2016 for related European Patent Application No. 13784683.8, in 12 pages.
Notice of Reasons for Rejection dated Mar. 7, 2017 and English translation for related Japanese Patent Application No. 2015-510265, in 6 pages.
Communication pursuant to Article 94(3) EPC dated Jul. 19, 2019 for related European Patent Application No. 13784683.8, in 5 pages.
Extended European Search Report dated Sep. 3, 2019 for related European Patent Application No. 16849812.9, in 15 pages.
Wayback Machine web archive from Mar. 23, 2012 of The Free Dictionary retrieved from https://www.thefreedictionary.com/optical+prism on Dec. 19, 2019 (Year 2012).
Office Action dated Dec. 26, 2019 for related U.S. Appl. No. 16/224,397, in 26 pages.
Office Action dated Feb. 3, 2020 for related Chinese Patent Application No. 201680055451.2 and its corresponding machine English translation, in 29 pages.

* cited by examiner

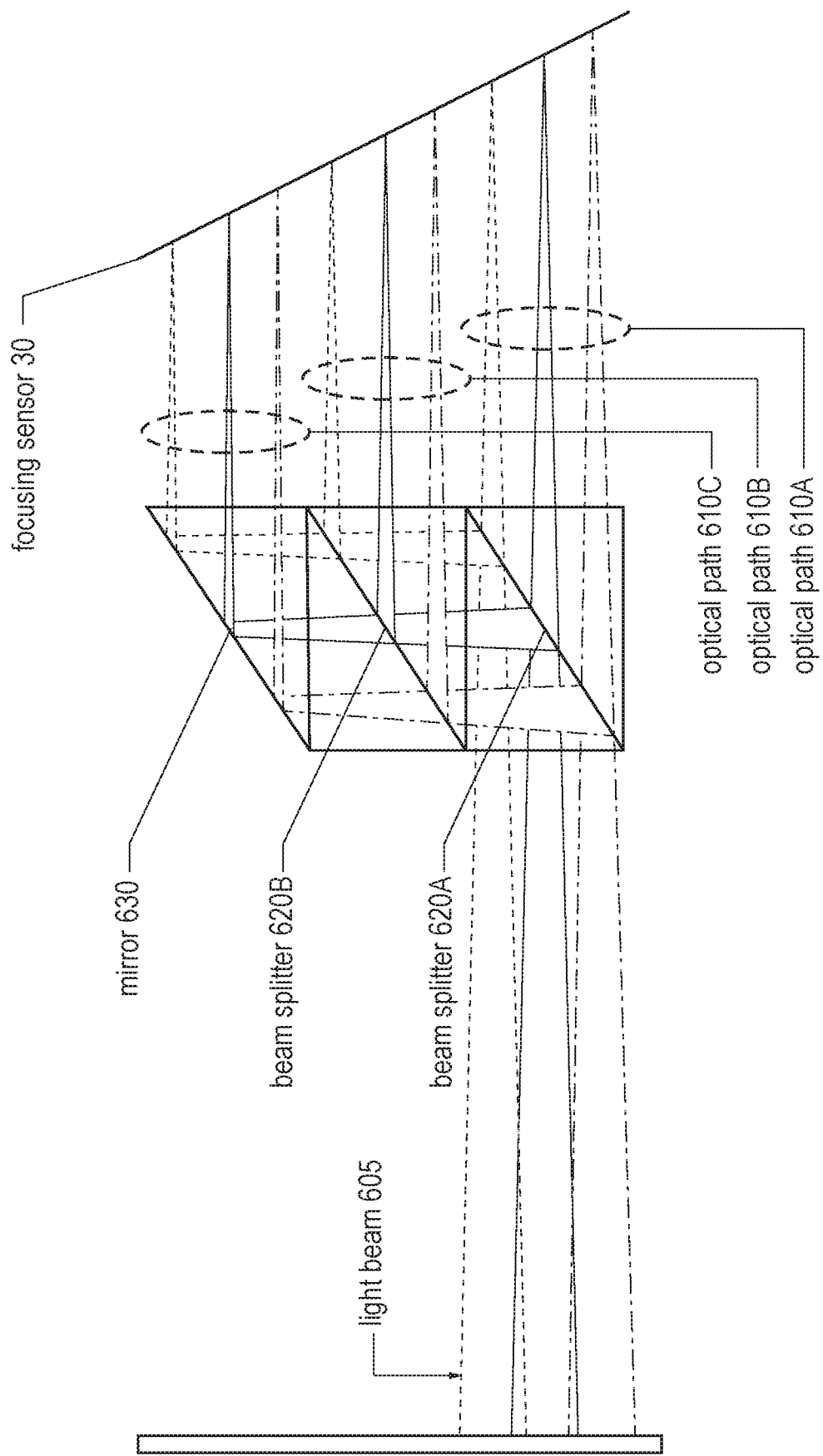

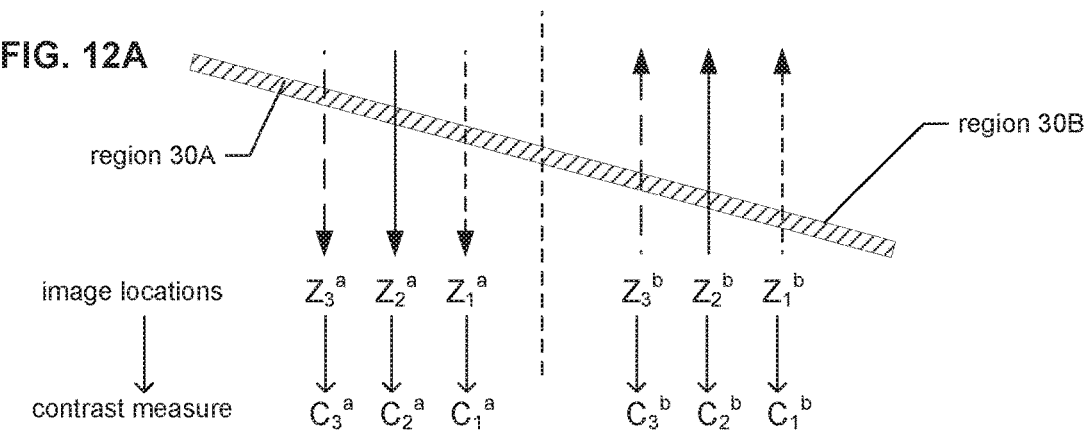
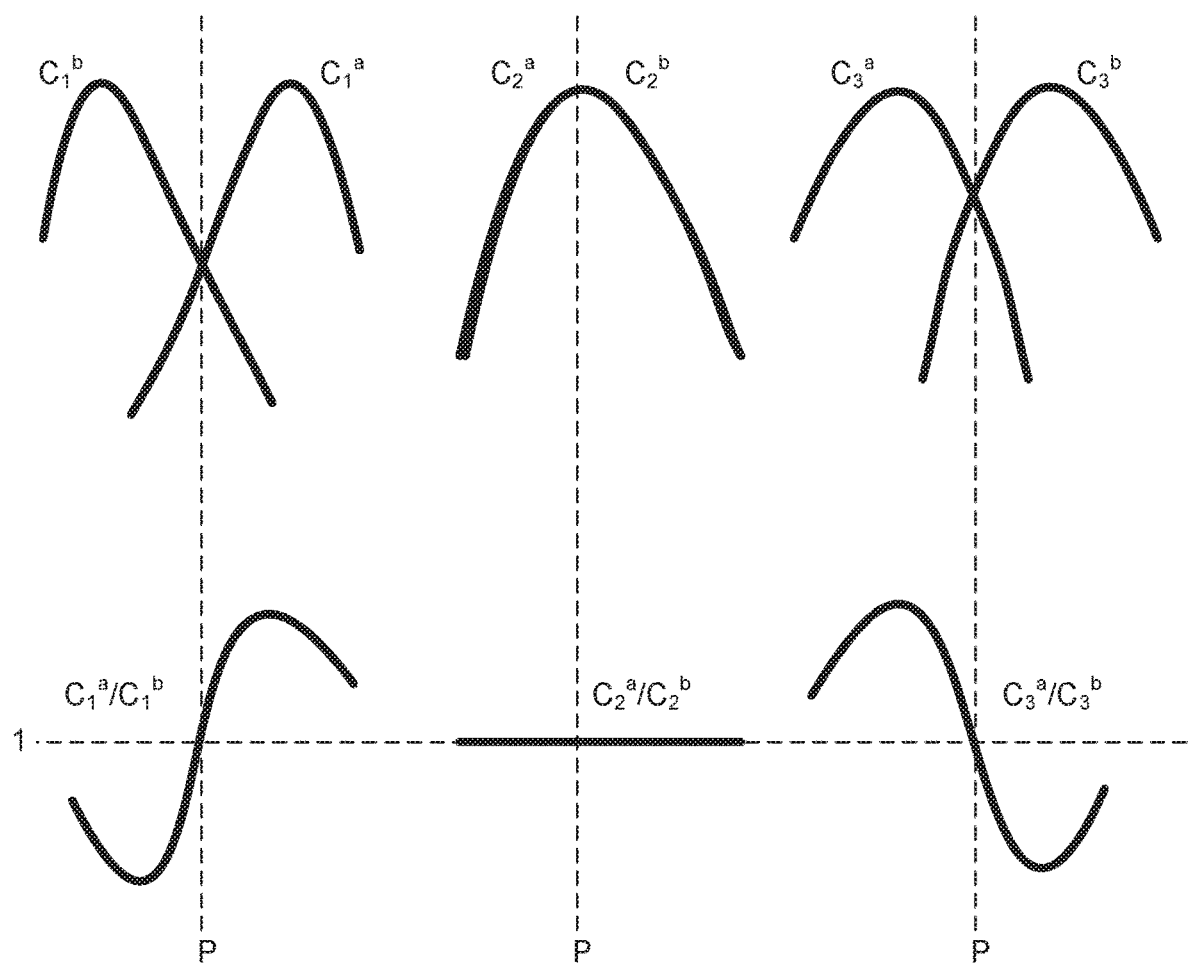
FIG. 12B

REAL-TIME FOCUSING IN LINE SCAN IMAGING

CROSS-REFERENCE TO RELATED APPLICATIONS

This application claims priority to U.S. Provisional Patent App. No. 62/232,229, filed on Sep. 24, 2015, and titled "Real-Time Focusing in Line Scan Imaging," the entirety of which is hereby incorporated herein by reference.

This application is related to U.S. patent application Ser. No. 14/398,443, filed on Oct. 31, 2014, which claims priority to International Patent App. No. PCT/US2013/031045, filed on Mar. 13, 2013, and U.S. Provisional Application No. 61/641,788, filed on May 2, 2012, the entireties of all of which are hereby incorporated herein by reference.

BACKGROUND

Field of the Invention

The present invention generally relates to digital pathology and more particularly relates to a multiple independent linear sensor apparatus for performing real-time focusing in line scan imaging.

Related Art

Most auto-focus methods in microscope imaging systems can be divided into two categories: laser-based interferometer for sensing slide position, and image content analysis. With laser-based interferometer methods, measuring the reflection of the laser beam off a slide surface can provide only global focus information of the slide position or the cover slip position. It lacks focusing accuracy for tissue samples with large height variations. In addition, the image content analysis methods require multiple image acquisitions at different focus depths, and use algorithms to compare the images to determine the best focus. However, acquiring multiple images at different focus depths may create time delays between focusing and imaging. Therefore, what is needed is a system and method that overcomes these significant problems found in the conventional methods described above.

SUMMARY

In an embodiment, a system for scanning a sample to acquire a digital image of the sample is disclosed. The system may comprise: a stage configured to support a sample; an objective lens having a single optical axis that is orthogonal to the stage; an imaging sensor; a focusing sensor; and at least one first beam splitter optically coupled to the objective lens and configured to receive a field of view corresponding to the optical axis of the objective lens, and simultaneously provide at least a first portion of the field of view to the imaging sensor and at least a second portion of the field of view to the focusing sensor.

The focusing sensor may receive the second portion of the field of view along an optical path, wherein the focusing sensor is tilted at an angle with respect to the optical path, such that the second portion of the field of view is acquired, by the focusing sensor, as an image comprising pixels representing different focal distances. Furthermore, the focusing sensor may comprise a plurality of regions, wherein each region of the focusing sensor receives the second portion of the field of view along a separate optical path, and wherein the focusing sensor is tilted at an angle with respect to each of the separate optical paths, such that the second portion of the field of view is acquired, by each region of focusing sensor, at a different focal distance than the other regions of focusing sensor.

Alternatively, the focusing sensor may comprise a plurality of regions, wherein each region of the focusing sensor receives the second portion of the field of view along a separate optical path, wherein the focusing sensor is orthogonal with respect to each of the separate optical paths, and wherein each of the separate optical paths has a different focus distance, such that the second portion of the field of view is acquired, by each region of focusing sensor, at a different focal distance than the other regions of focusing sensor.

Alternatively, the focusing sensor may comprise a first portion and a second portion, wherein the first portion of the focusing sensor receives the second portion of the field of view along a first optical path and is tilted at a first angle with respect to the first optical path, and wherein the second portion of the focusing sensor receives the second portion of the field of view along a second optical path, that is separate from the first optical path, and is tilted at a second angle with respect to the second optical path that is reverse to the first angle.

Alternatively, the focusing sensor may comprise a first region and a second region, wherein the first region receives the second portion of the field of view along a first optical path, wherein the second region receives a mirrored second portion of the field of view along a second optical path, and wherein the focusing sensor is tilted at an angle with respect to each of the first optical path and the second optical path.

Alternatively, the tilted sensor can be substituted with a non-tilted sensor and a wedge prism placed in front of the non-tilted sensor. The angle of the tilt can have a negative value, a zero value, or a positive value.

Alternatively, the focusing sensor may be a section of a sensor with a wedge optic in front of it to create focal variation covering this focusing section of the sensor along the sensor axis, while the other section of the sensor acts as an imaging sensor.

In addition, the system may comprise a processor that is configured to, for each portion of the sample to be scanned: acquire a focusing image of the portion of the sample from the focusing sensor; for each of a plurality of positions on the focusing sensor, calculate a contrast measure for a region of the focusing image corresponding to that position on the focusing sensor; determine a peak for the contrast measures; and determine a position for the objective lens that provides the peak for the contrast measures at the one parfocal point on the focusing sensor.

In another embodiment, a method for automatic real-time focusing is disclosed. The method may comprise using a processor in a slide scanner to, for each portion of a sample to be scanned: prior to, at the same time as, or after the portion of the sample being sensed by an imaging sensor, acquire a focusing image of the portion of the sample from a focusing sensor, wherein a portion of a field of view that is sensed by the focusing sensor is offset from a portion of the field of view that is sensed by the imaging sensor, such that, in a scan direction, the focusing sensor senses a portion of the field of view before, at the time that, or after the imaging sensor senses that same portion of the field of view, and wherein one point on the focusing sensor is parfocal with the imaging sensor, for each a plurality of positions on the focusing sensor, calculate a contrast measure for a region of the focusing image corresponding to that position on the focusing sensor, determine a peak for the contrast measures, determine a position for an objective lens that provides the peak for the contrast measures at the parfocal point on the focusing sensor, and move the objective lens to the determined position; and acquire an image of the portion of the sample from the imaging sensor while the objective lens is at the determined position.

In another embodiment, a non-transitory computer-readable medium having instructions stored thereon is disclosed. The instructions, when executed by a processor, cause the processor to, for each portion of a sample to be scanned: prior to, at the same time as, or after the portion of the sample being sensed by an imaging sensor, acquire a focusing image of the portion of the sample from a focusing sensor, wherein a portion of a field of view that is sensed by the focusing sensor is offset from a portion of the field of view that is sensed by the imaging sensor, such that, in a scan direction, the focusing sensor senses a portion of the field of view before, at the same time that, or after the imaging sensor senses that same portion of the field of view, and wherein one point on the is parfocal with the imaging sensor, for each a plurality of positions on the focusing sensor, calculate a contrast measure for a region of the focusing image corresponding to that position on the focusing sensor, determine a peak for the contrast measures, determine a position for an objective lens that provides the peak for the contrast measures at the parfocal point on the focusing sensor, and move the objective lens to the determined position; and acquire an image of the portion of the sample from the imaging sensor while the objective lens is at the determined position.

In another embodiment, a relationship (e.g., a difference or a ratio) between the contrast measure from the focusing image and the contrast measure from the main image is defined, and the peak of this relationship is determined, to thereby determine the position of the objective lens with respect to the parfocal point.

Other features and advantages of the disclosed embodiments will become readily apparent to those of ordinary skill in the art after reviewing the following detailed description and accompanying drawings.

BRIEF DESCRIPTION OF THE DRAWINGS

The structure and operation of embodiments will be understood from a review of the following detailed description and the accompanying drawings in which like reference numerals refer to like parts and in which:

FIG. 6 is a block diagram illustrating an example tilted focusing sensor with focusing optics, according to an embodiment;

FIG. 12A illustrates the directionality of focal distances for two images acquired by a focusing sensor, according to an embodiment.

FIG. 12B illustrates contrast functions for two reversed images acquired by a focusing sensor, according to an embodiment.

DETAILED DESCRIPTION

Figure 1:
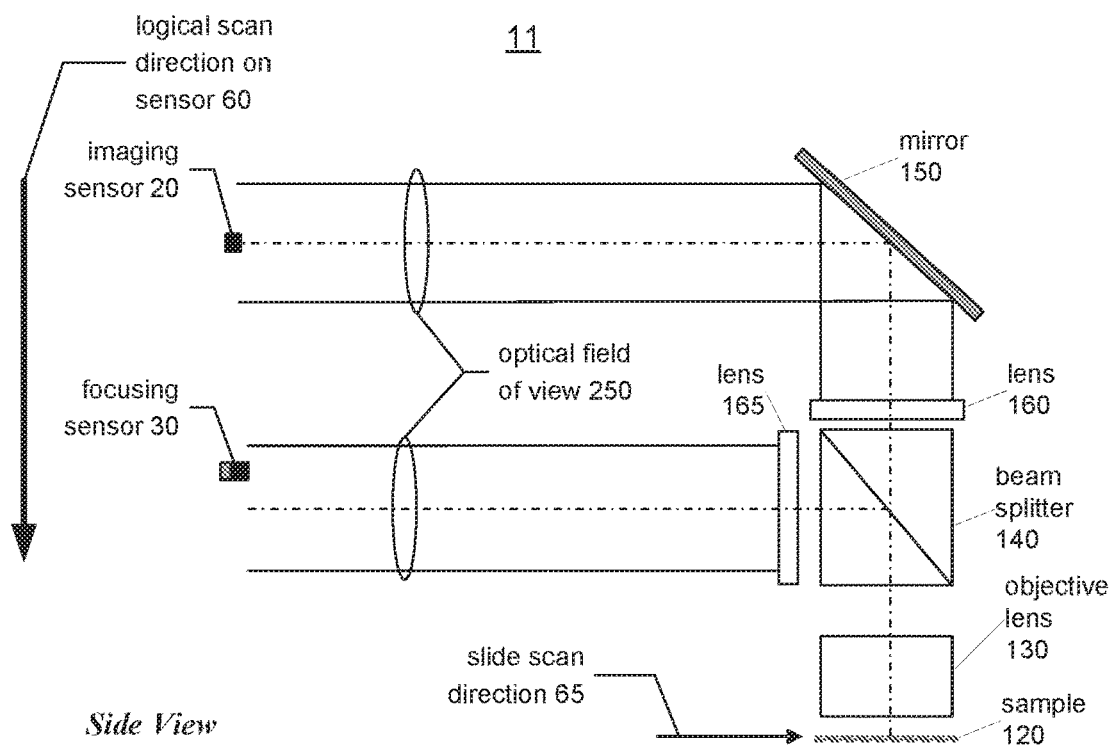
FIG. 1 is a block diagram illustrating an example side view configuration of a scanning system, according to an embodiment.

Certain embodiments are based on image content analysis (e.g., tissue finding and macro focus), and take advantage of line imaging and line focusing for accurate real-time autofocusing. In one embodiment, full stripe focusing is performed during a retrace process of line scanning. In an alternative embodiment, focusing is performed during image scanning. Both embodiments eliminate time delays in image scanning, thereby speeding up the entire digital image scanning process. In addition, certain embodiments provide for real-time (i.e., instantaneous or near-instantaneous) focusing in line scan imaging using multiple linear detectors or other components. After reading this description it will become apparent to one skilled in the art how to implement various alternative embodiments and use those embodiments in alternative applications. However, although various embodiments will be described herein, it is understood that these embodiments are presented by way of example only, and not limitation. As such, this detailed description of various alternative embodiments should not be construed to limit the scope or breadth of the present application as set forth in the appended claims.

In an embodiment, one or more focus points are determined for a sample (e.g., a tissue sample prepared on a glass microscope slide). For example, a macro focus point or a plurality of focus points may be determined for the sample. Specifically, one or more positions on the sample may be determined. For each of these positions, the sample may be moved along X and Y axes (e.g., by a motorized stage), such that, that position on the sample is located under an objective lens. In an alternative embodiment, the objective lens may be moved along X and Y axes, or both the objective lens and the sample may be moved along X and Y axes, such that the objective lens is located above each position on the sample. In any case, for each position, an image of the region of the sample at that position may be acquired at a plurality of focus heights, while the sample is stationary in the X and Y axes, via a focusing sensor optically coupled with the objective lens as the objective lens is moved along a Z axis (i.e., orthogonal to both the X and Y axes) through the plurality of focus heights. Software may be used to compute the best focus height for each position, based on the images acquired at the plurality of focus heights for the position. A real-time focus mechanism may then constrain the objective lens at the computed best focus heights at the corresponding positions, via a feedback loop, while scanning the entire sample. It should be understood that while the term "focus height" or "Z height" may be used throughout to describe a distance of the objective lens with respect to the sample, this term does not limit the disclosed embodiments to an objective lens positioned above the sample, but should instead be understood to encompass any distance that represents a distance between the objective lens and a plane of the sample, regardless of their orientations to each other.

FIG. 1 is a block diagram illustrating an example side view configuration of a scanning system 11, according to an embodiment. In the illustrated embodiment, scanning system 11 comprises a sample 120 (e.g., a tissue sample prepared on a glass microscope slide) that is placed on a motorized stage (not shown), illuminated by an illumination system (not shown), and moved in a scanning direction 65. An objective lens 130 has an optical field of view (FOV) 250 that is trained on sample 120 and provides an optical path for light from the illumination system that passes through the specimen on the slide, reflects off of the specimen on the slide, fluoresces from the specimen on the slide, or otherwise passes through objective lens 130.

FIG. 1 illustrates the relative positions between an imaging sensor 20 and a focusing sensor 30 in space. The light travels on the optical path through objective lens 130 to a beam splitter 140 that allows some of the light to pass through lens 160 to imaging sensor 20. As illustrated in FIG. 1, the light may be bent by a mirror 150 (e.g., at 90°) between lens 160 and imaging sensor 20. Imaging sensor 20 may be, for example, a line charge-coupled device (CCD) or a line complementary metal-oxide semiconductor (CMOS) device.

In addition, some of the light travels from beam splitter 140 through lens 165 to focusing sensor 30. As illustrated in FIG. 1, this light may be bent by beam splitter 140 (e.g., at 90°) between objective lens 130 and lens 165. Focusing sensor 30 may also be, for example, a line charge-coupled device (CCD) or line CMOS device.

In an embodiment, the light that travels to imaging sensor 20 and the light that travels to focusing sensor 30 each represents the complete optical field of view 250 from object lens 130. Based on the configuration of the system, the scanning direction 65 of sample 120 is logically oriented with respect to imaging sensor 20 and focusing sensor 30 such that the logical scanning direction 60 causes the optical field of view 250 of objective lens 130 to pass over the respective focusing sensor 30 and imaging sensor 20.

Figure 2:
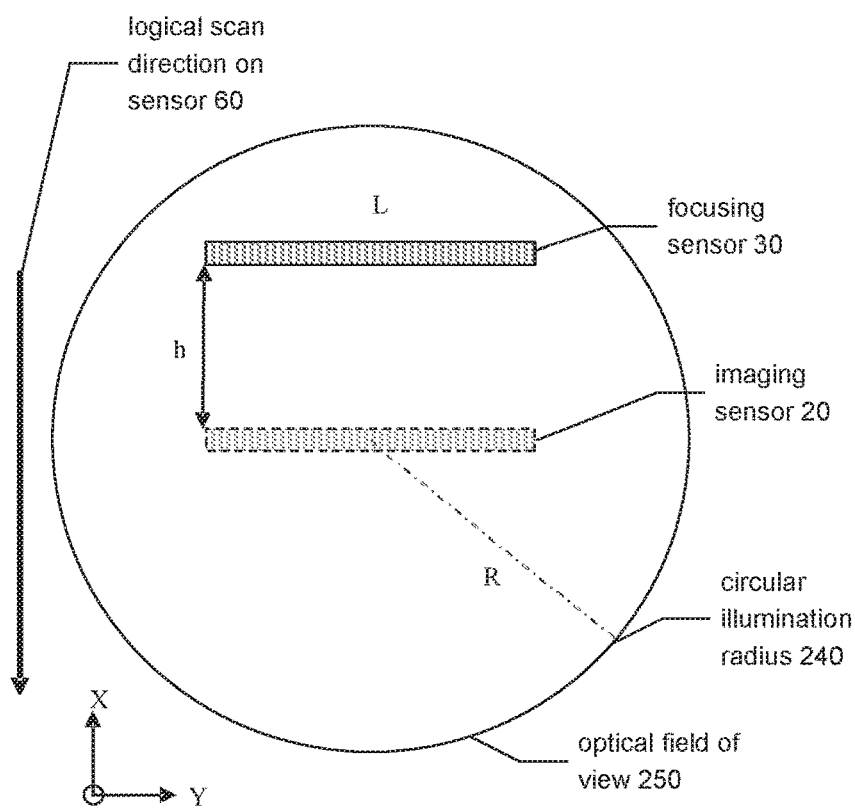
FIG. 2 is a block diagram illustrating an example configuration of a focusing sensor and imaging sensor with respect to a radius of illumination and a circular optical field of view, according to an embodiment.

FIG. 2 is a block diagram illustrating an example configuration of focusing sensor 30 and imaging sensor 20 with respect to an optical field of view 250 having a circular illumination radius 240, according to an embodiment. In the illustrated embodiment, the positioning of focusing sensor 30 is shown with respect to imaging sensor 20 and the logical scan direction 60. In this case, the scan direction 60 refers to the direction in which the stage or specimen (e.g., a tissue sample) is moving with respect to sensors 30 and 20 in space. As illustrated, imaging sensor 20 is centered within optical field of view 250 of objective lens 130, while focusing sensor 30 is offset from the center of optical field of view 250 of objective lens 130. The direction in which focusing sensor 30 is offset from the center of optical field of view 250 of the objective lens 130 is the opposite of the logical scanning direction 60. This placement logically orients focusing sensor 30 in front of imaging sensor 20, such that, as a specimen on a slide is scanned, focusing sensor 30 senses the image data before, at the same time that, or after the imaging sensor 20 senses that same image data. Thus, a given portion (e.g., line) of sample 120 will reach focusing sensor 30 first, and subsequently reach imaging sensor 20 second.

When imaging sensor 20 and focusing sensor 30 are projected onto a same plane using, for example a beamsplitter, focusing sensor 30 is within the illumination circle, which has a radius R, of the optical field of view 250 at a location ahead of the primary imaging sensor 20 in terms of the logical scanning direction 60. Thus, when a view of a section of a tissue sample passes focusing sensor 30, focus data can be captured and the focus height for objective lens 130 can be calculated based on one or more predetermined algorithms, prior to, at the same time as, or after the time of the view of the same section of tissue sample passing imaging sensor 20. The focus data and the calculated focus height for objective lens 130 can be used to control (e.g., by a controller) the height of objective lens 130 from sample 120 before the view of the same section of the tissue sample is sensed by imaging sensor 20 via objective lens 130. In this manner, imaging sensor 20 senses the view of the section of the tissue sample while objective lens 130 is at the calculated focus height.

Circular illumination radius 240 preferably illuminates an optical field of view 250 covering both focusing sensor 30 and imaging sensor 20. Radius 240 is a function of the field of view on sample 120 and the optical magnification of the focusing optical path $M_{focusing}$. The function can be expressed as:

$$2R = FOV * M_{focusing}$$

For example, for $M_{focusing}=20$ and FOV=1.25 mm (e.g., Leica PlanApo 20× objective), R=12.5 mm. Imaging sensor 20 is projected in the middle of the optical field of view 250 for best image quality, while focusing sensor 30 is offset with respect to the center of optical field of view 250 by a distance h from imaging sensor 20. There is a relationship among the distance h, the radius R, and the length L of focusing sensor 30, such that:

$$h \leq \text{square root}(R^2 - (L/2)^2)$$

For example, for a sensor length=20.48 mm and R=12.5 mm, h≤7.2 mm. It should be understood that, when h>0, any given region of sample 120 is sensed by focusing sensor 30 first and imaging sensor 20 second, whereas, when h<0, the given region of sample 120 is sensed by imaging sensor 20 first and focusing sensor 30 second. If h=0, the given region of sample 120 is sensed by imaging sensor 20 and focusing sensor 30 simultaneously as the stage moves along slide scan direction 65. In an embodiment, the average of multiple line images of the same region of sample 120 may be used as the line image for that region.

The available time t for focusing sensor 30 to capture multiple camera lines, for focus height calculation and for moving objective lens 130 to the right focus height, is a function of the distance h between focusing sensor 30 and imaging sensor 20, magnification $M_{focusing}$, and scan speed v:

$$v*t = h/M_{focusing}$$

For example, for a scan speed of 4.6 mm/s, the maximum time available is about 78.3 ms for $M_{focusing}$=20 and h=7.2 mm. The maximum number of camera lines captured by focusing sensor 30, available for the focus calculation is:

$$N = t*\kappa, \text{ where } \kappa \text{ is the line rate of the focusing sensor 30.}$$

For example, for a camera line rate of 18.7 kHz, $N_{max}$=1,464 lines, where objective lens 130 stays at the same height. Otherwise, $N<N_{max}$ to allow objective lens 130 to move to the next focus height.

At a high level, a sample 120 (e.g., tissue sample) is passed under objective lens 130 in an X direction. A portion of sample 120 is illuminated to create an illuminated optical field of view 250 in the Z direction of a portion of sample 120 (i.e., perpendicular to an X-Y plane of sample 120). The illuminated optical field of view 250 passes through objective lens 130 which is optically coupled to both focusing sensor 30 and imaging sensor 20, for example, using a beam splitter 140. Focusing sensor 30 and imaging sensor 20 are positioned, such that focusing sensor 30 receives a region or line of the optical field of view 250 before, at the same time as, or after imaging sensor 20 receives the same region or line. In other words, as focusing sensor 30 is receiving a first line of image data, imaging sensor 20 is simultaneously receiving a second line of image data which was previously received by focusing sensor 30 and which is a distance $h/M_{focusing}$ on sample 120 from the first line of image data. It will take a time period Δt for imaging sensor 20 to receive the first line of image data after focusing sensor 30 has received the first line of image data, where Δt represents the time that it takes sample 120 to move a distance $h/M_{focusing}$ in the logical scan direction 60.

During the period Δt, a processor of scanning system 10 calculates an optimal focus height in the Z direction for the first line of image data, and adjusts objective lens 130 to the calculated optimal focus distance before, at the time that, or after imaging sensor 20 receives the first line of image data.

In an embodiment, focusing sensor 30 is separate from imaging sensor 20 and is tilted at an angle θ with respect to a direction that is perpendicular to the optical imaging path. Thus, for each line of image data, focusing sensor 30 simultaneously receives pixels of image data at a plurality of Z height values. The processor may then determine the pixel(s) having the best focus within the line of image data (e.g., having the highest contrast with respect to the other pixels within the line of image data). After the optimal Z height value is determined, the processor or other controller may move objective lens 130 in the Z direction to the determined optimal Z height value before, simultaneously as, or after imaging sensor 20 receives the same line of image data.

Figure 3A:
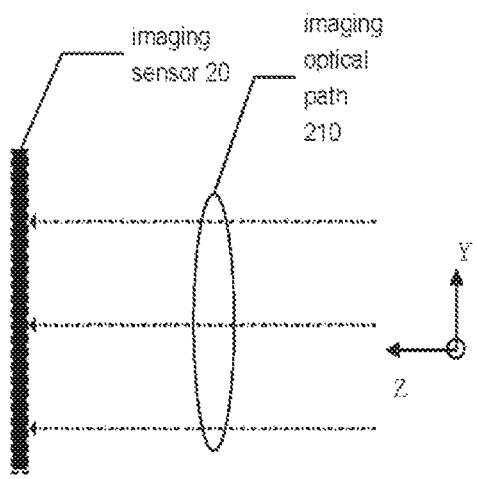
FIG. 3A is a block diagram illustrating an example top view configuration of a imaging sensor, according to an embodiment.
Figure 3B:
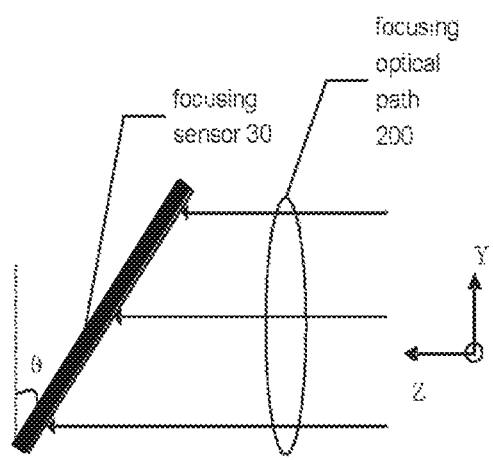
FIG. 3B is a block diagram illustrating an example top view configuration of a tilted focusing sensor, according to an embodiment.
Figure 3C:
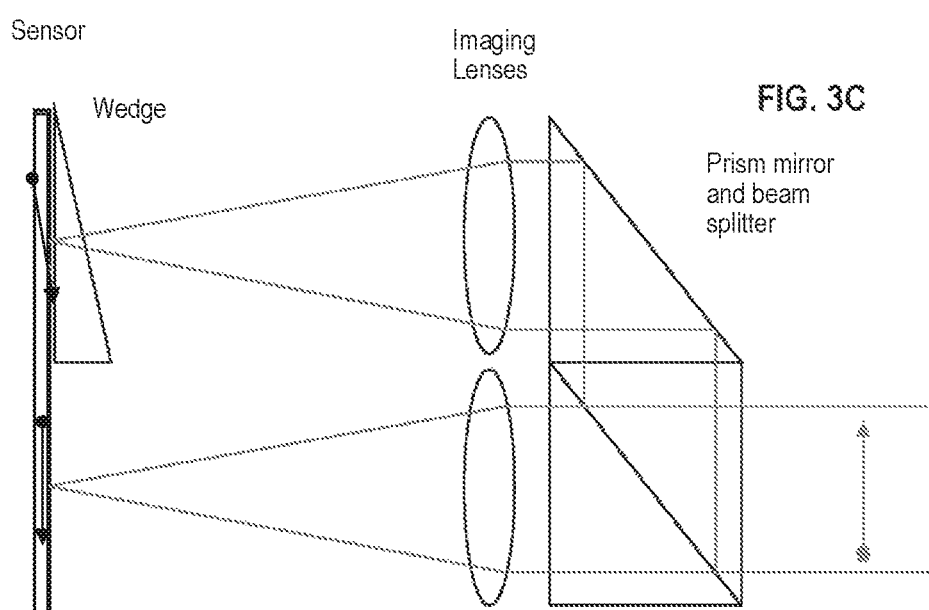
FIG. 3C is a block diagram illustrating an example of a sensor, in which half of the sensor is used to produce a normal image, and the other half is used to produce an image with various focal depths across it, according to an embodiment.

As discussed above, focusing sensor 30 may be tilted within the optical field of view such that light from objective lens 130 is sensed by focusing sensor 30 at a plurality of Z height values. FIG. 3A is a block diagram illustrating an example top view configuration of imaging sensor 20 with respect to an imaging optical path 210, according to an embodiment. FIG. 3B is a block diagram illustrating an example top view configuration of a tilted focusing sensor 30, with respect to a focusing optical path 200, according to an embodiment. As can be seen in FIG. 3B, focusing sensor 30 is tilted at an angle θ with respect to a direction that is perpendicular to focusing optical path 200. FIG. 3C is a block diagram illustrating an example of a sensor, in which half of the sensor is used to acquire a main image, and the other half of the sensor is used to acquire a focusing image.

Thus, an image projected on tilted focusing sensor 30 and acquired as a line of image data by tilted focusing sensor 30 will have variable sharpness or contrast. This line of image data will have its highest focus (e.g., greatest sharpness or contrast) in a particular region or pixel location of tilted focusing sensor 30. Each region or pixel location of tilted focusing sensor 30 may be directly mapped or otherwise correlated to a Z height of objective lens 130, such that the Z height of objective lens 130 may be determined from a particular pixel location of tilted focusing sensor 30. Thus, once the pixel location of highest focus (e.g., highest contrast) is determined, the Z height of objective lens 130 providing the highest focus may be determined by identifying the Z height of objective lens 130 that is mapped to that pixel location of highest focus. Accordingly, a feedback loop may be constructed. By this feedback loop, for a given region on sample 120, the position of objective lens 130 may be automatically controlled (e.g., by increasing or decreasing the height of objective lens 130) to always correspond to the position on tilted focusing sensor 30 having the highest focus for that region, before, at the time that, or after imaging sensor 20 senses the same region of sample 120, such that the region of sample 120 being imaged by imaging sensor 20 is always at the best available focus.

Figure 4:
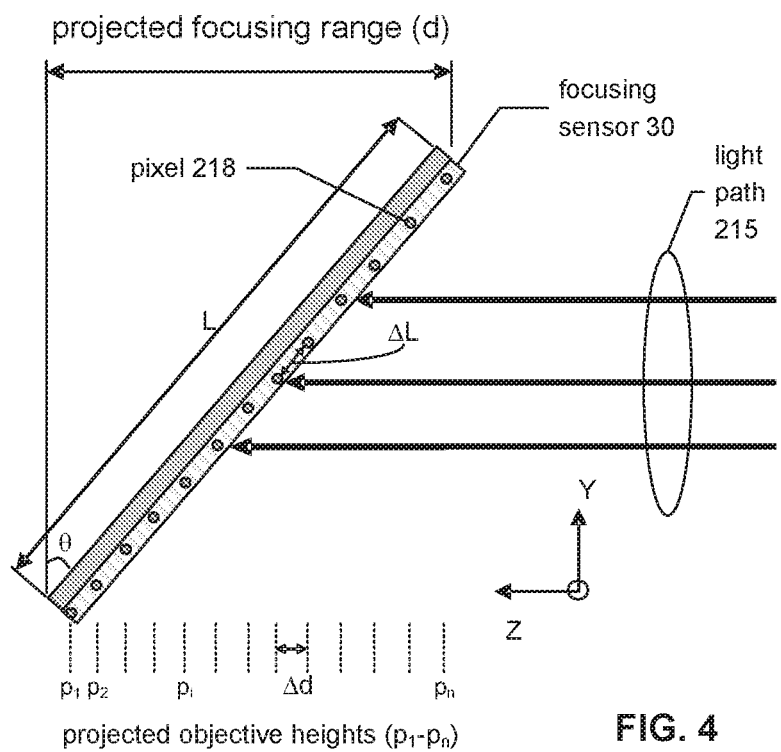
FIG. 4 is a block diagram illustrating an example top view configuration of a tilted focusing sensor, according to an embodiment.

FIG. 4 is a block diagram illustrating an example tilted focusing sensor 30, according to an embodiment. In the illustrated embodiment, tilted focusing sensor 30 comprises a plurality of sensor pixels 218 within a range of focusing (z) on a tissue sample (e.g., 20 μm). As illustrated in FIG. 4, tilted focusing sensor 30 may be positioned at a location where the entire focusing range (z) in the Z direction is transferred by optics to the entire array of sensor pixels 218 in tilted focusing sensor 30 in the Y direction. The location of each sensor pixel 218 is directly correlated or mapped to a Z height of objective lens 130. As illustrated in FIG. 4, each dashed line, $p_1, p_2, \ldots p_i \ldots p_n$, across projected focusing range (d) represents a different focus value and corresponds to a different focus height of objective lens 130. The $p_i$ having the highest focus for a given region of a sample can be used by scanning system 11 to determine the optimal focus height of objective lens 130 for that region of sample 120.

The relationship between the projected focusing range (d) on tilted focusing sensor 30 and the focusing range (z) on sample 120 may be expressed as: $d = z*M_{focusing}^2$, where $M_{focusing}$ is the optical magnification of the focusing path. For instance, if z=20 μm and $M_{focusing}$=20, then d=8 mm.

In order to cover the entire projected focusing range (d) by a tilted focusing sensor 30 that is a linear array sensor, the tilting angle θ should follow the relationship: sin θ=d/L, where L is the length of focusing sensor 30. Using d=8 mm and L=20.48 mm, θ=23.0°. θ and L can vary as long as tilted focusing sensor 30 covers the entire focusing range (z).

The focusing resolution, or the minimum step of focus height motion Δz along the Z axis is a function of the sensor pixel size, e=minimum (ΔL). Derived from the above formulas: Δz=e*z/L. For instance, if e=10 µm, L=20.48 mm, and z=20 µm, then Δz=0.0097 µm<10 nm.

In an embodiment, a scan line (e.g., one-dimensional image data), acquired by tilted focusing sensor 30 from sample 120, is analyzed. A figure of merit (FOM) (e.g., contrast of the data) may be defined. The location (corresponding to a focus height value of objective lens 130) of a pixel 218 of the maximum FOM on the sensor array can be found. In this manner, the focus height of objective lens 130, corresponding to the location of the pixel 218 of the maximum FOM, can be determined for that scan line.

The relationship between the location $L_i$ on tilted focusing sensor 30 of a pixel i and the focus height $Z_i$ of objective lens 130 may be represented as follows: $L_i = Z_i * M_{focusing}^2 / \sin\theta$ If the focus distance is determined by a mean from $L_1$ to $L_2$, according to the analysis of the data from tilted focusing sensor 30 discussed above, the focus height of objective lens 130 needs to be moved from $Z_1$ to $Z_2$ based on: $Z_2 = Z_1 + (L_2 - L_1) * \sin\theta / M_{focusing}^2$ Although the field of view (FOV) in the Y axis of focusing sensor 30 and imaging sensor 20 can be different, the centers of both sensors are preferably aligned to each other along the Y axis.

Figure 5:
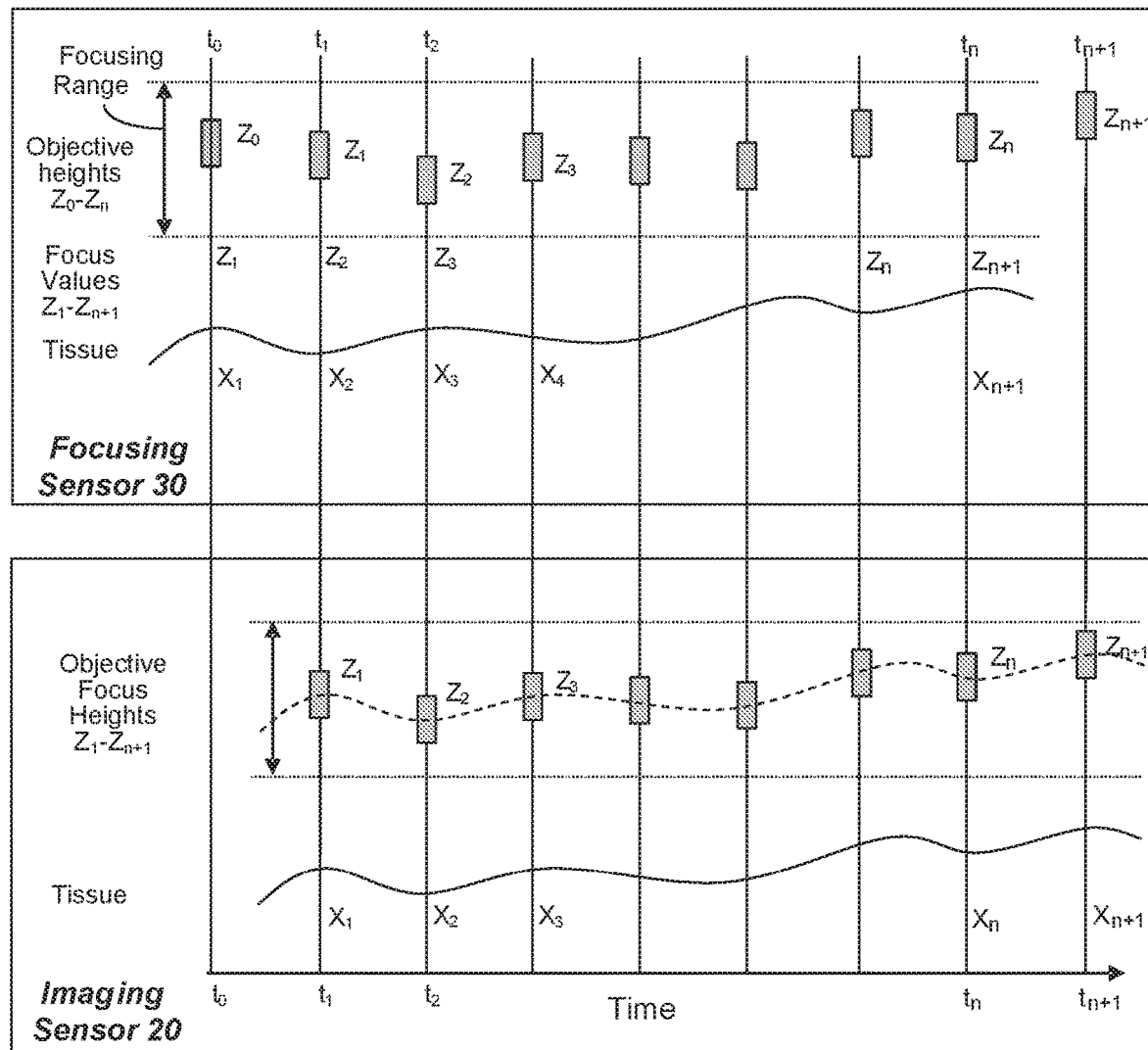
FIG. 5 is a time chart diagram illustrating an example interplay between a focusing sensor and an imaging sensor during scanning, according to an embodiment.

FIG. 5 is a time chart diagram illustrating an example interplay between a focusing sensor 30 and an imaging sensor 20 during scanning, according to an embodiment. Specifically, the timing of a scan using an imaging sensor 20 and focusing sensor 30 is illustrated. At time $t_0$, the focus height of objective lens 130 is at $Z_0$ on tissue section $X_1$, which is in the field of view of focusing sensor 30. Focusing sensor 30 receives focusing data corresponding to the tissue section $X_1$. The focus height $Z_1$ is determined to be the optimal focus height for tissue section $X_1$ using the focusing data and, in some embodiments, associated focusing algorithms. The optimal focus height is then fed to the Z positioner to move objective lens 130 to the height $Z_1$, for example, using a control loop. At $t_1$, tissue section $X_1$ is moved into the field of view of imaging sensor 20. With the correct focus height, imaging sensor 20 will sense an optimally-focused image of tissue section $X_1$. At the same time $t_1$, focusing sensor 30 captures focusing data from tissue section $X_2$, and the focusing data will be used to determine the optimal focus height $Z_2$ which in turn will be fed into the Z positioner prior to, at the time that, or after tissue section $X_2$ passes into the field of view of imaging sensor 20 at time $t_2$. Such a process can continue until the entire tissue sample is scanned.

In general at time $t_n$, tissue section $X_{n+1}$ is in the field of view of focusing sensor 30, tissue section $X_n$ is in the field of view of imaging sensor 30, and objective lens 130 is at a focus height of $Z_n$. Furthermore, prior to, at the time, or after $t_{n+1}$, the optimal focus height for tissue section $X_{n+1}$ is determined and the focus height of objective lens 130 is adjusted to $Z_{n+1}$. At time $t_0$, focusing sensor 30 senses tissue section $X_1$ and determines the focus height as $Z_1$ for tissue section $X_1$; at time $t_1$, tissue section $X_1$ moves under imaging sensor 20 and objective lens 130 moves to focus height $Z_1$ while focusing sensor 30 senses tissue section $X_2$ and determines the focus height as $Z_2$ for tissue section $X_2$; at time $t_n$, tissue section $X_n$ moves under imaging sensor 20 and objective lens 130 moves to focus height $Z_n$ while focusing sensor 30 senses tissue section and determines the focus height as $Z_{n+1}$ for tissue section $X_{n+1}$. $X_{n-1}$ and $X_n$ do not necessarily represent consecutive or adjacent lines of image data, as long as a scan line is acquired by focusing sensor 30 and an optimal focus height for the scan line is determined and set prior to, at the same time as, or after the same scan line being acquired by imaging sensor 20. In other words, focusing sensor 30 and imaging sensor 20 may be arranged such that one or more scan lines exist between the field of view of focusing sensor 30 and the field of view of imaging sensor 20, i.e., that distance h between focusing sensor 30 and imaging sensor 20 comprises one or more scan lines of data. For instance, in the case that the distance h comprises five scan lines, tissue section $X_6$ would be in the field of view of focusing sensor 30 at the same time that tissue section $X_1$ is in the field of view of imaging sensor 20. In this case, the focus height of objective lens 130 would be adjusted to the calculated optimal focus height after the tissue section $X_5$ is sensed by imaging sensor 20 but prior to, at the same time as, or after the tissue section $X_6$ being sensed by imaging sensor 20. Advantageously, the focus height of objective lens 130 may be smoothly controlled between tissue section $X_1$ and $X_6$ such that there are incremental changes in focus height between $X_1$ and $X_6$ that approximate a gradual slope of the tissue sample.

FIG. 6 illustrates a tilted focusing sensor 30 that utilizes one or more beam splitters and one or more prism mirrors, according to an embodiment. The beam splitter(s) and mirror(s) are used to create a plurality of images of the same field of view on tilted focusing sensor 30, with each of the plurality of images at a different focal distance, thereby enabling focusing sensor 30 to simultaneously sense multiples images of the same region of sample 120 at different foci (corresponding to different focus heights for objective lens 130). Focusing sensor 30 may be a single large line sensor, or may comprise a plurality of line sensors (e.g., positioned in a row along a longitudinal axis).

Specifically, FIG. 6 illustrates a tilted focusing sensor 30 that utilizes beam splitters 620A and 620B and prism mirror 630 to guide a light beam 605 (illustrated as separate red, blue, and green channels, although they do not need to be separated channels) through a plurality of optical paths 610A-610C, each having different focal distances, onto a single tilted line sensor 30. It should be understood that light beam 605 conveys a field of view from objective lens 130. As illustrated, the optical paths, in order from highest focal distance to lowest focal distance, are 610A, 610B, and 610C. However, it should be understood that each optical path will reach tilted line sensor 30 at a range of focal distances, rather than at a single focal distance, due to the tilt of tilted line sensor 30. In other words, the image acquired by tilted line sensor 30 on each optical path will comprise pixels acquired at a focal distance that increases from a first side of the image to a second, opposite side of the image. In the illustrated example, light beam 605 enters beam splitter 620A and is split into an optical path 610A, which proceeds to a first region of tilted focusing sensor 30 at a first focal distance, and an optical path which proceeds to beam splitter 620B. The optical path that proceeds to beam splitter 620B is split into an optical path 610B, which proceeds to a second region of tilted focusing sensor 30 at a second focal distance, and an optical path 610C, which is reflected off of mirror 630 onto a third region of tilted focusing sensor 30 at a third focal distance. Each of the first, second, and third focal distances and first, second, and third regions are different from each other. In this manner, a single tilted focusing sensor 30 simultaneously senses light beam 605 at a plurality of different focal distances (e.g., three in the illustrated example). It should be understood that fewer or more beam splitters 620 and/or mirrors 630 may be used to create fewer or more optical paths 610 with different focal distances (e.g., two optical paths or four or more optical paths, each with a different focal distance with respect to tilted focusing sensor 30).

With respect to the embodiment illustrated in FIG. 6, the best focus may be determined and correlated to a height of objective lens 130, in the same manner as described above. Redundant information from a plurality of images at different focal distances may provide higher confidence to a focus result.

Figure 7A:
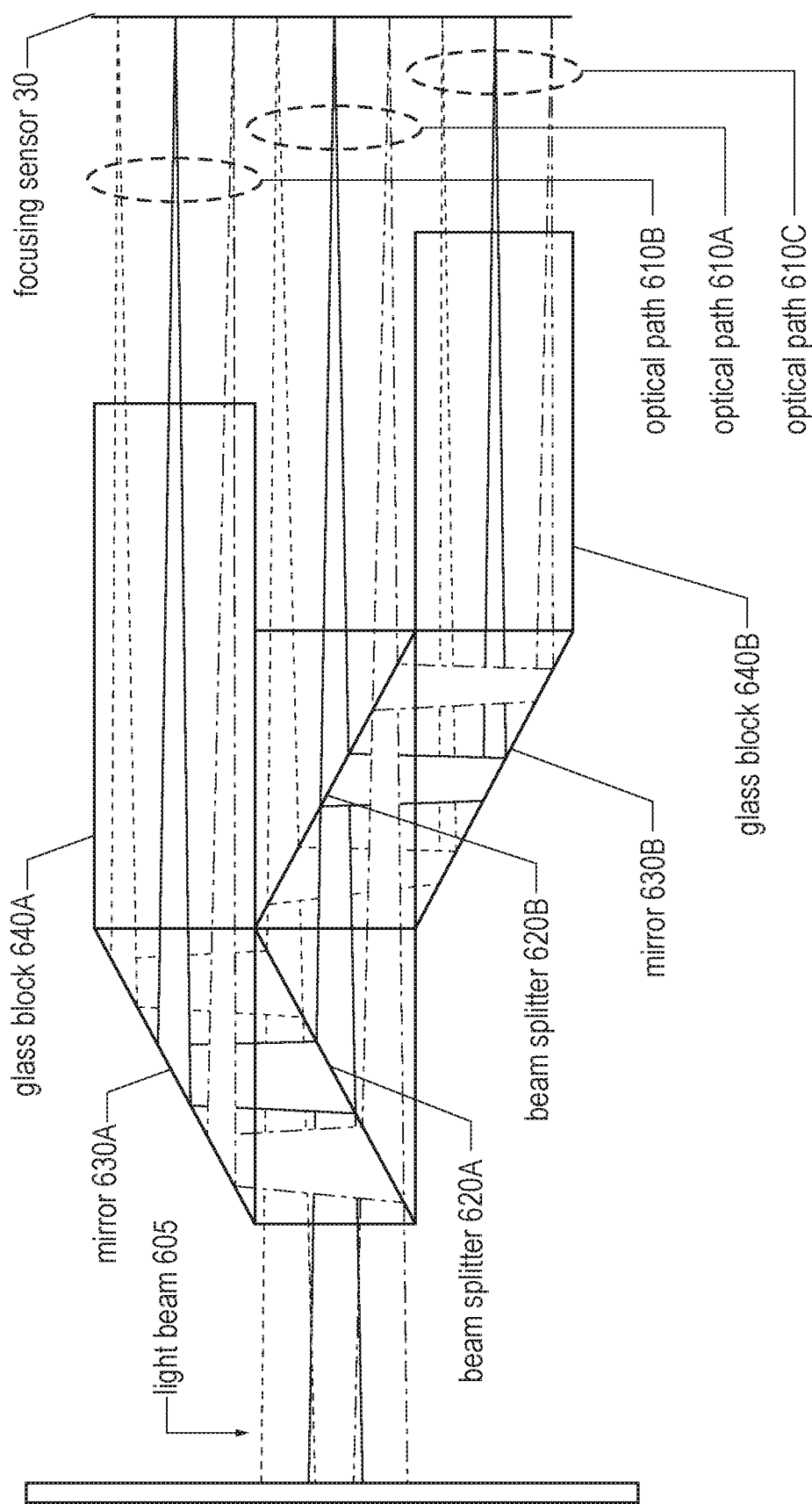
FIGS. 7A-7C are block diagrams illustrating an example non-tilted focusing sensor with focusing optics, according to an embodiment.
Figure 7B:
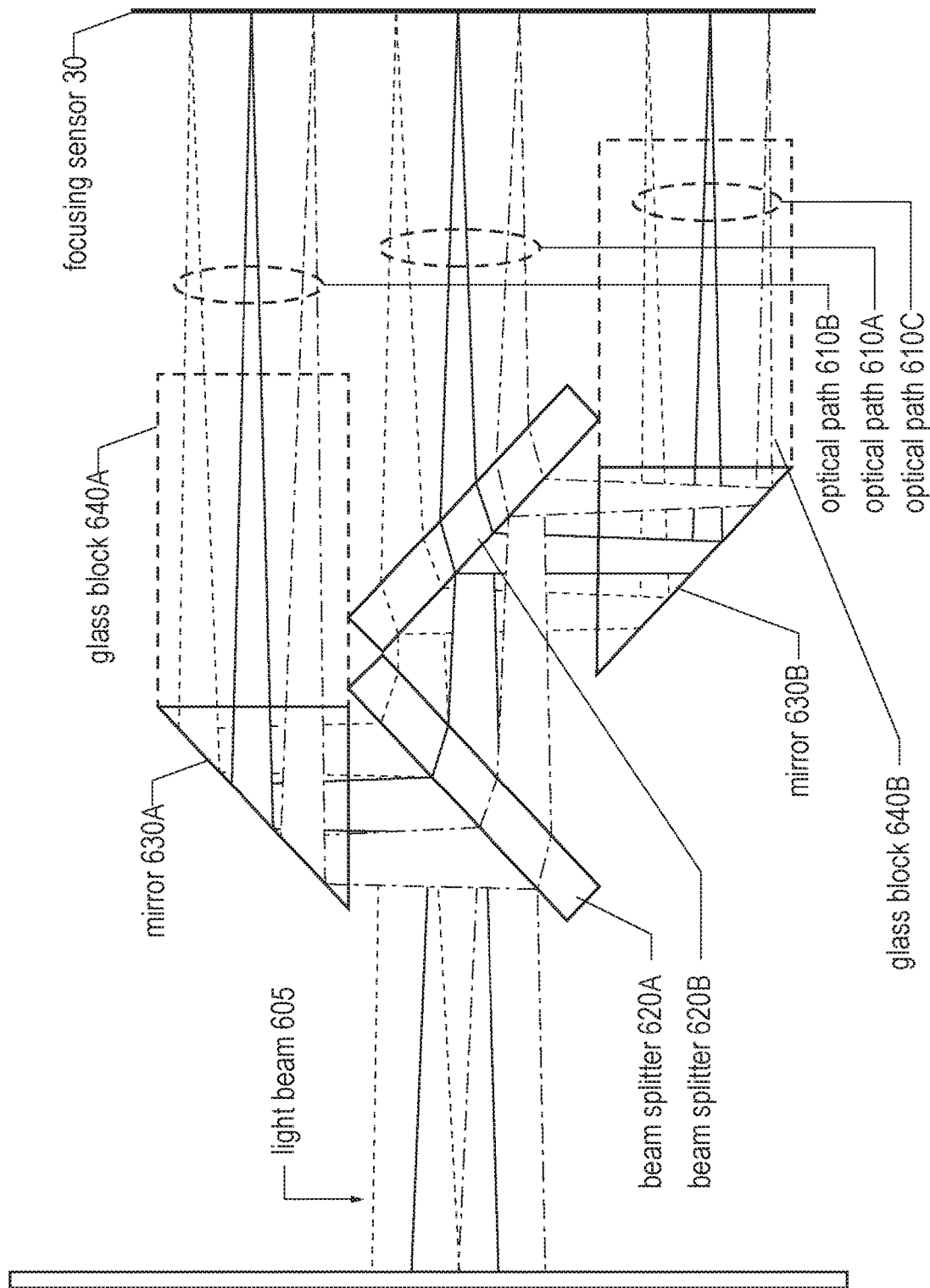

FIGS. 7A and 7B illustrate alternatives to a tilted focusing sensor. Specifically, FIGS. 7A and 7B illustrate a non-tilted focusing sensor 30 that utilizes one or more beam splitters and one or more prism mirrors to achieve the same results as a tilted focusing sensor, according to a couple of embodiments. The beam splitter(s) and mirror(s) are used to create a plurality of images of the same field of view on focusing sensor 30, with each of the plurality of images at a different focal distance, thereby enabling focusing sensor 30 to simultaneously sense multiple images of the same region of sample 120 at different foci (corresponding to different focus heights for objective lens 130). Focusing sensor 30 may be a single large line sensor, or may comprise a plurality of line sensors positioned in a row along a longitudinal axis.

FIG. 7A illustrates a non-tilted focusing sensor 30 that utilizes beam splitters 620A and 620B and prism mirrors 630A and 630B to guide a light beam 605 (illustrated as separate red, blue, and green channels, although they do not need to be separated channels) through a plurality of optical paths 610A-610C, each having different focal distances, onto a single line sensor 30. It should be understood that light beam 605 conveys a field of view from objective lens 130. As illustrated, the optical paths, in order from highest focal distance to lowest focal distance, are 610A, 610B, and 610C. In the illustrated example, light beam 605 enters beam splitter 620A and is split into an optical path 610B, which is reflected off of mirror 630A and through glass block 640A onto a first region of focusing sensor 30 at a first focal distance, and an optical path which proceeds to beam splitter 620B. The optical path that proceeds to beam splitter 620B is split into an optical path 610A which passes onto a second region of focusing sensor 30 (e.g., adjacent to the first region of focusing sensor 30) at a second focal distance, and an optical path 610C, which is reflected off of mirror 630B and through glass block 640B onto a third region of focusing sensor 30 (e.g., adjacent to the second region of focusing sensor 30) at a third focal distance. Each of the first, second, and third focal distances and first, second, and third regions are different from each other. In this manner, focusing sensor 30 simultaneously senses light beam 605 at a plurality of different focal distances (e.g., three in the illustrated example). It should be understood that fewer or more beam splitters 620, mirrors 630, glass blocks 640, and/or regions of focusing sensor 30 may be used to create fewer or more optical paths 610 with different focal distances (e.g., two optical paths or four or more optical paths, each with a different focal distance with respect to focusing sensor 30).

FIG. 7B illustrates a non-tilted focusing sensor 30 that utilizes beam splitters 620A and 620B and prism mirrors 630A and 630B to guide a light beam 605 (illustrated as separate red, blue, and green channels, although they do not need to be separated channels) through a plurality of optical paths 610A-610C, each having different focal distances, onto respective ones of a plurality of line sensors 30A-30C. As illustrated, the optical paths, in order from highest focal distance to lowest focal distance, are 610A, 610B, and 610C. In the illustrated example, light beam 605 enters beam splitter 620A and is split into an optical path 610B, which is reflected off of mirror 630A and through glass block 640A onto a first region of focusing sensor 30 at a first focal distance, and an optical path which proceeds to beam splitter 620B. The optical path that proceeds to beam splitter 620B is split into an optical path 610A which passes onto a second region of focusing sensor 30 at a second focal distance, and an optical path 610C, which is reflected off of mirror 630B and through glass block 640B onto a third region of focusing sensor 30 at a third focal distance. Each of the first, second, and third focal distances and the first, second, and third regions of focusing sensor 30 are different from each other. In this manner, focusing sensor 30 simultaneously senses light beam 605 at a plurality of different respective focal distances (e.g., three in the illustrated example). It should be understood that fewer or more beam splitters 620, mirrors 630, glass blocks 640, and/or regions of focusing sensor 30 may be used to create fewer or more optical paths 610 with different focal distances (e.g., two optical paths or four or more optical paths, each with a different focal distance with respect to a different focusing sensor 30).

In the embodiments illustrated in FIGS. 6, 7A, and 7B, the beam splitters and mirrors are positioned after the imaging lens in the optical path. Alternatively, tube lenses may be positioned after the beam splitting optics. In this alternative embodiment, the locations of individual images with the same field of view are defined by the focal lengths and positions of the lenses.

Figure 7C:
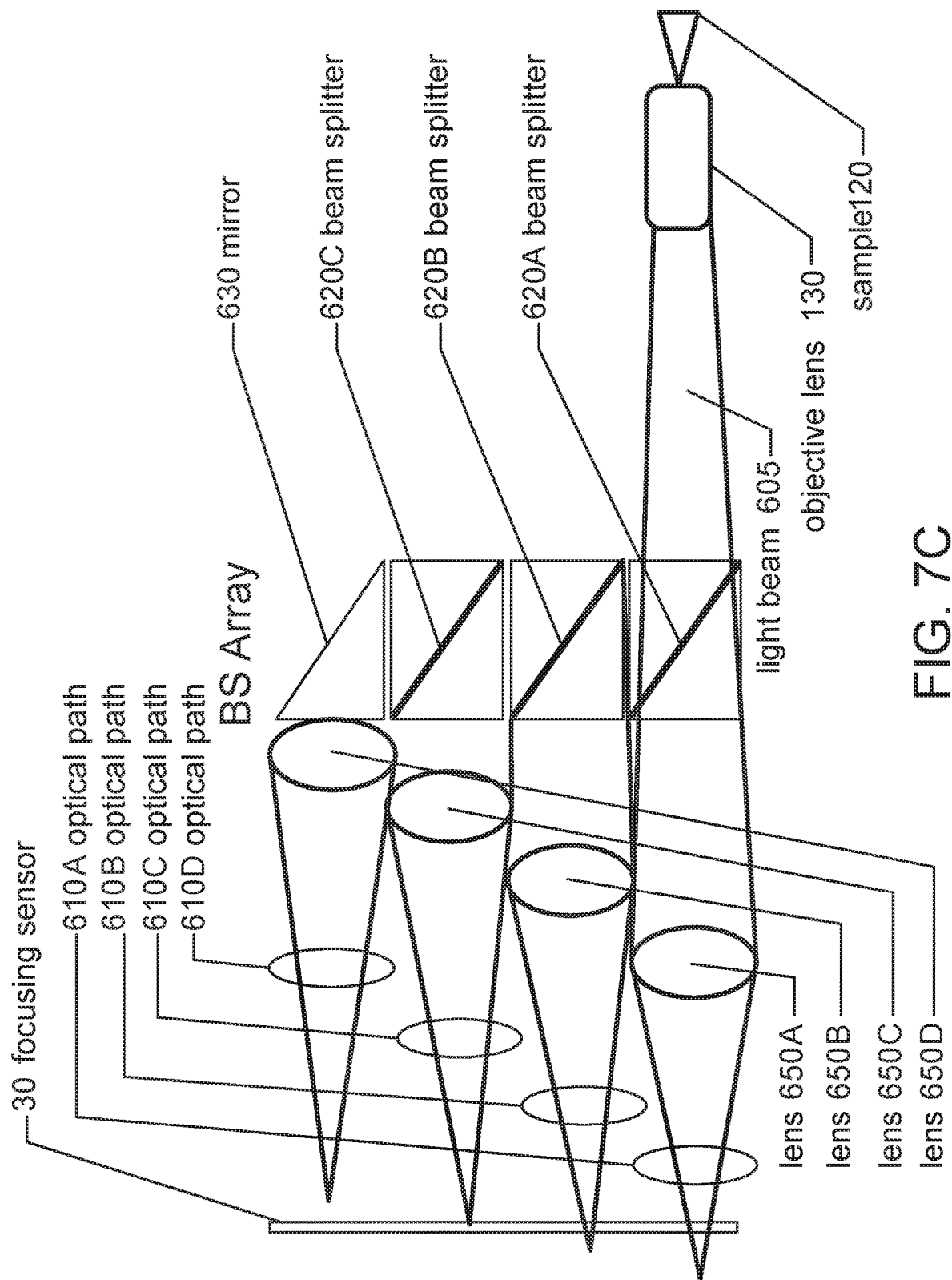

FIG. 7C illustrates an alternative non-tilted focusing sensor 30 in which the beam splitting optics are positioned before tube lenses, according to an embodiment. Specifically, non-tilted focusing sensor 30 utilizes beam splitters 620A, 620B, and 620C and prism mirror 630 to guide a light beam 605 through a plurality of optical paths 610A-610D, each having different focal distances, onto a single line sensor 30. As illustrated, the optical paths, in order from highest focal distance to lowest focal distance, are 610A, 610B, 610C, and 610D. In the illustrated example, light beam 605 enters beam splitter 620A and is split into an optical path 610A, which is focused by lens 650A onto a first region of focusing sensor 30 at a first focal distance, and an optical path which proceeds to beam splitter 620B. The optical path that proceeds to beam splitter 620B is split into an optical path 610B, which is focused by lens 650B onto a second region of focusing sensor 30 at a second focal distance, and an optical path which proceeds to beam splitter 620C. The optical path that proceeds to beam splitter 620B is split into an optical path 610C, which is focused by lens 650C onto a third region of focusing sensor 30 at a third focal distance, and an optical path 610C, which is reflected off of mirror 630 and focused by lens 650D onto a fourth region of tilted focusing sensor 30 at a fourth focal distance. Each of the first, second, third, and fourth focal distances and the first, second, third, and fourth regions are different from each other. In this manner, focusing sensor 30 (e.g., comprising a single line sensor or a plurality of line sensors) simultaneously senses light beam 605 at a plurality of different focal distances (e.g., four in the illustrated example). It should be understood that fewer or more beam splitters 620, mirrors 630, and/or regions of focusing sensor 30 may be used to create fewer or more optical paths 610 with different focal distances (e.g., two optical paths, three optical paths, or five or more optical paths, each with a different focal distance with respect to focusing sensor 30).

In the embodiments described above, a given region of a sample 120 is simultaneously acquired by different regions of a focusing sensor 30 at a plurality of different focal distances, producing a plurality of images at different focal distances. An algorithm can then be applied to this plurality of images to determine a best focal distance, which can be correlated to a focus height of objective lens 130 along the Z axis.

Figure 8:
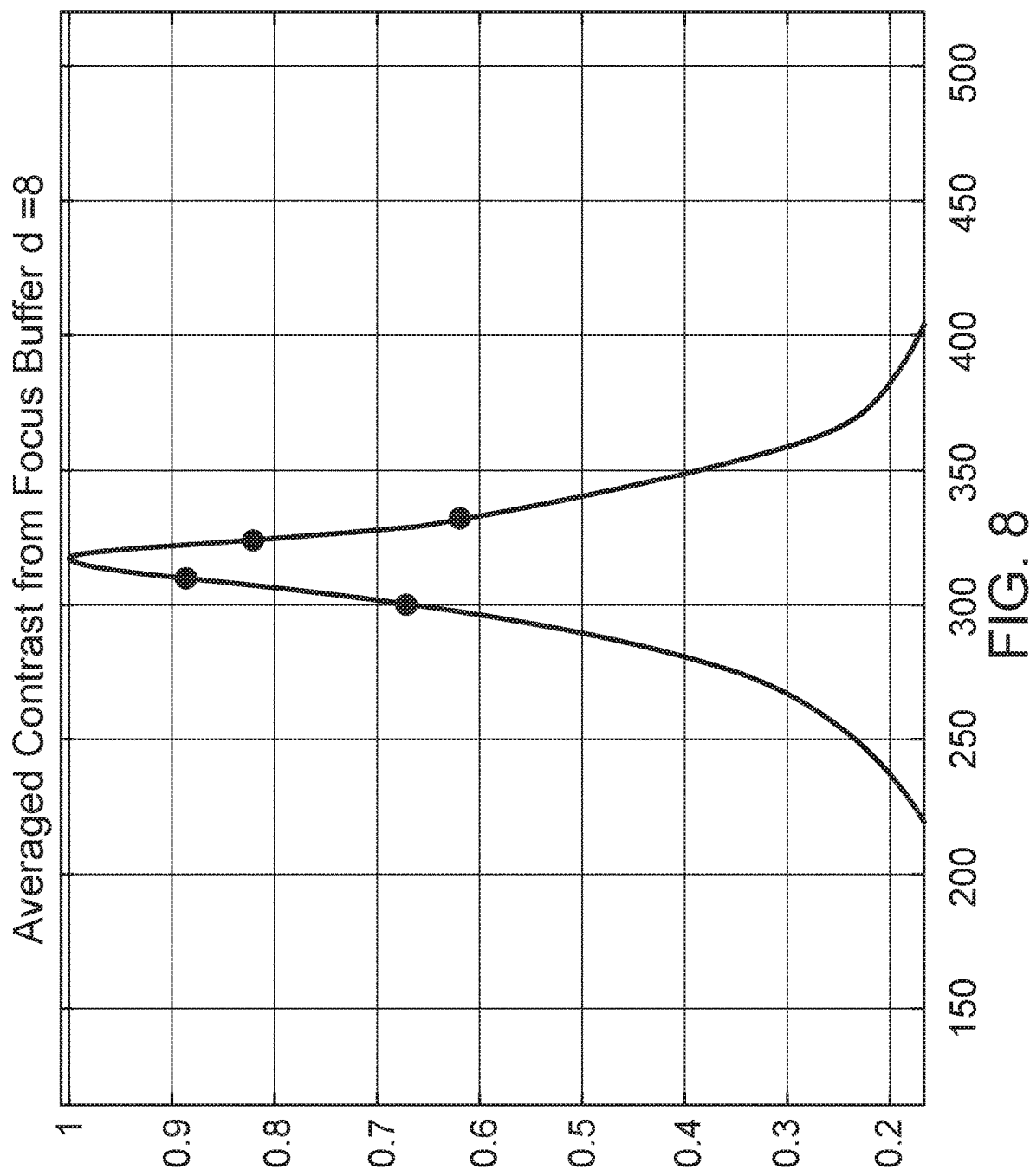
FIG. 8 illustrates example results from a peak-finding algorithm, according to an embodiment.

By aligning the optics (e.g., as discussed above), the plurality of images acquired by different regions of focusing sensor 30 can correlate or map to various focus spots from a focus buffer. The focus buffer may contain contrast measures, for the focus points, calculated from image data that has been continuously acquired while objective lens 130 moves along the Z axis (i.e., as the focus height of objective lens 130 changes). For instance, a measure of contrast (e.g., averaged contrast) for each focus height represented by the plurality of images may be plotted, as illustrated in an example by the points in FIG. 8. The best focus (i.e., the peak of contrast measures in the focus buffer) can be determined by using a peak-finding algorithm (e.g., fitting, hill-climbing, etc.) to identify the peak of a curve that best fits the points, as illustrated in an example by the curve in FIG. 8. The peak of the curve represents the best contrast measure, and maps to a particular focus height that provides the best focus.

Figure 9A:
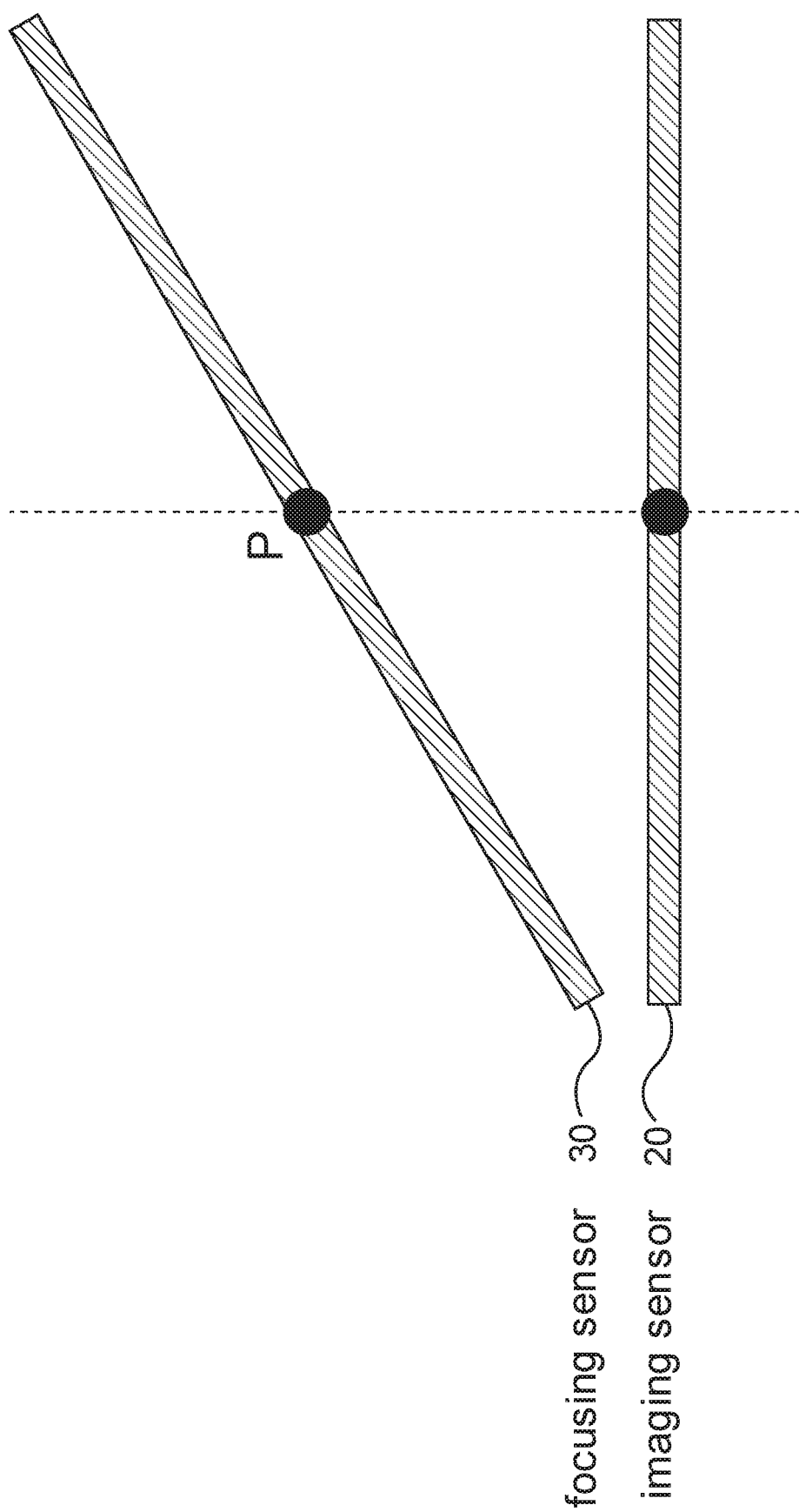
FIG. 9A illustrates a focal relationship between a tilted focusing sensor and imaging sensor, according to an embodiment.

FIG. 9A illustrates the focal relationship between a tilted focusing sensor 30 and imaging sensor 20, according to an embodiment. Specifically, in an embodiment, a point P of tilted focusing sensor 30 is parfocal with imaging sensor 20. Thus, when sensing a region of a sample 120 using tilted focusing sensor 30, the appropriate focus height of objective lens 130 from sample 120 may be determined as the focus height of objective lens 130 that positions the pixel(s) having the best focus at point P of focusing sensor 30. This determined focus height is what may then be used for objective lens 130 when sensing the same region using imaging sensor 20.

Figure 9B:
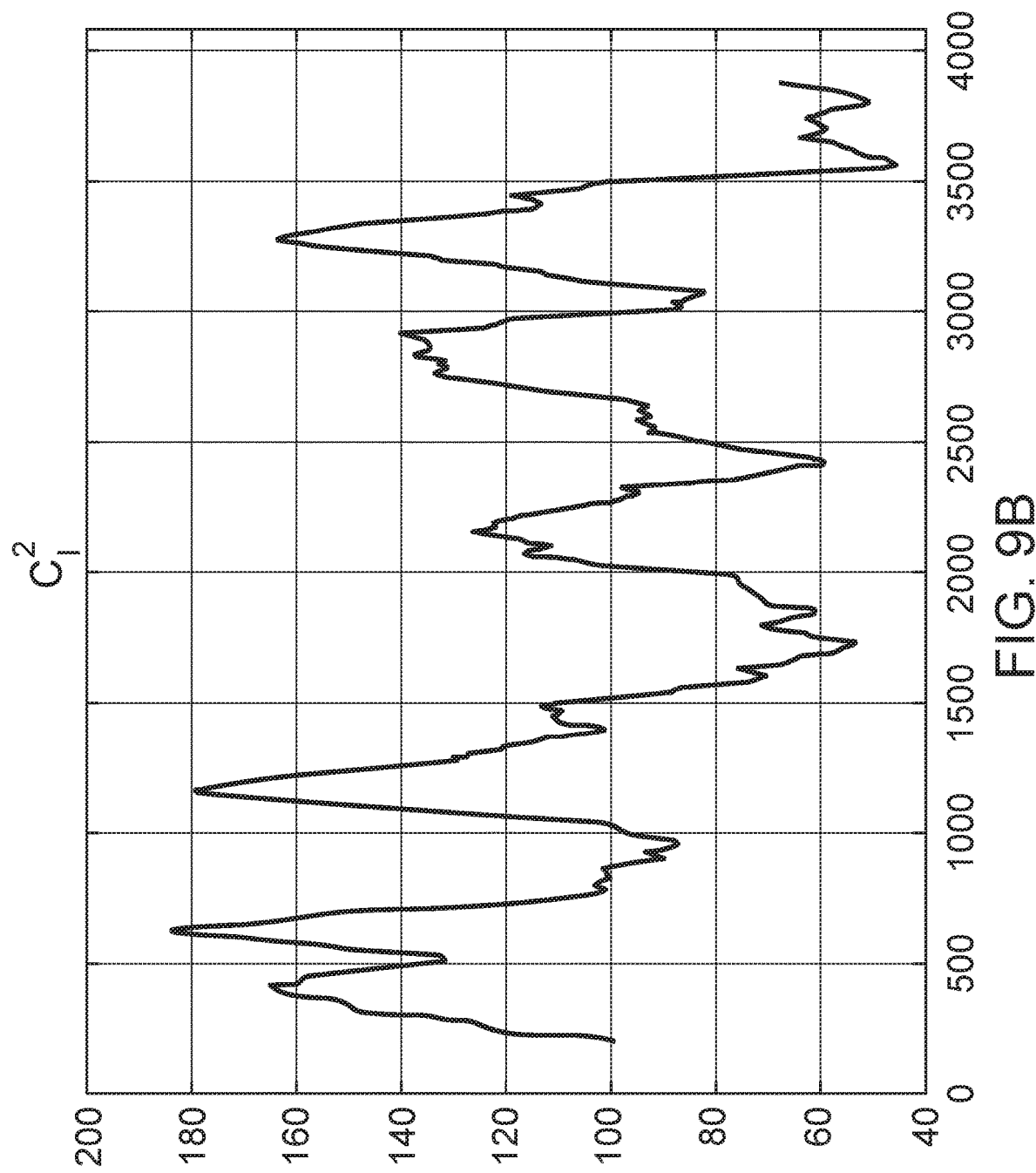
FIGS. 9B-9D illustrate the relationships of contrast functions for a tilted focusing sensor and imaging sensor, according to an embodiment.
Figure 9C:
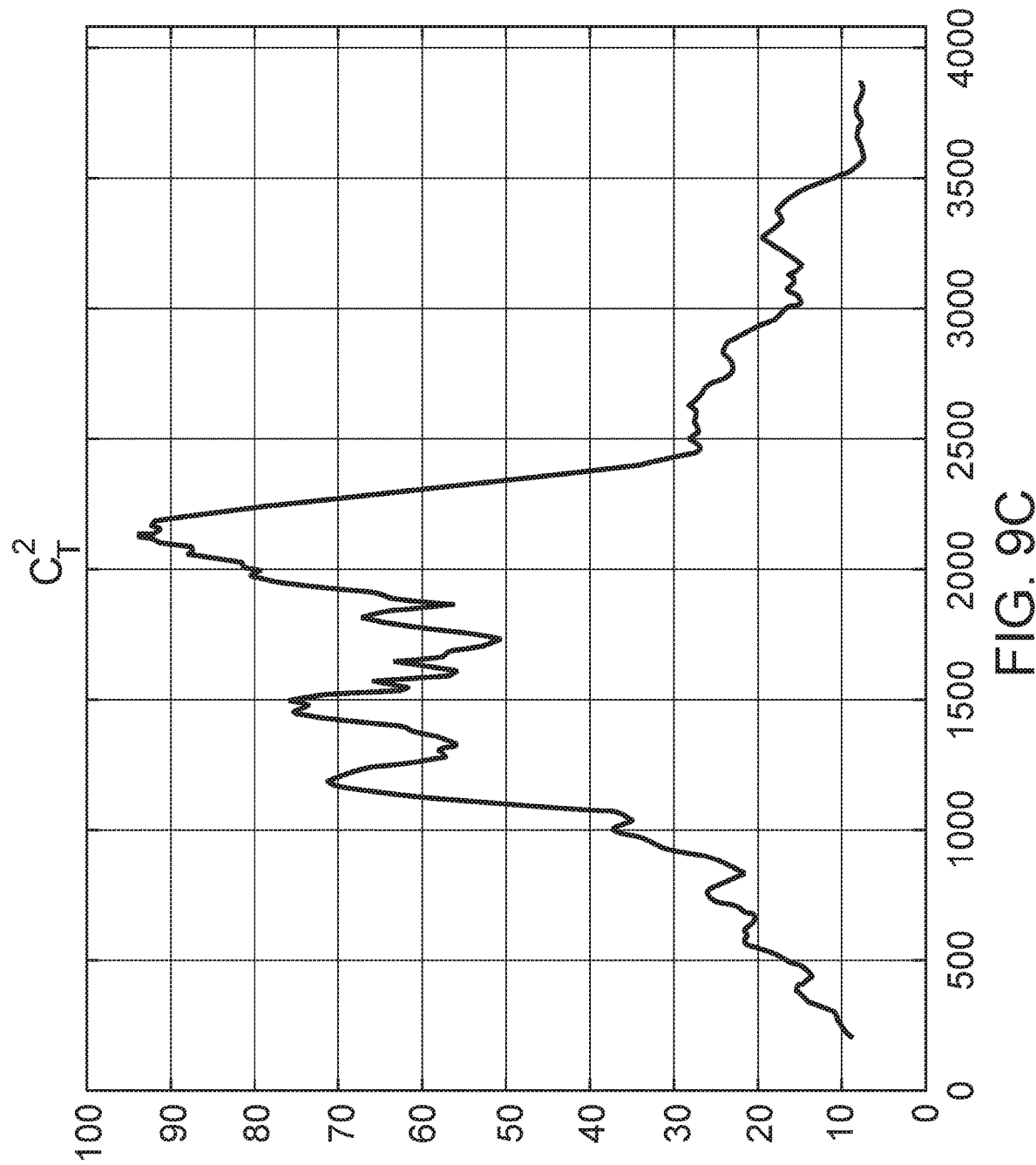
Figure 9D:
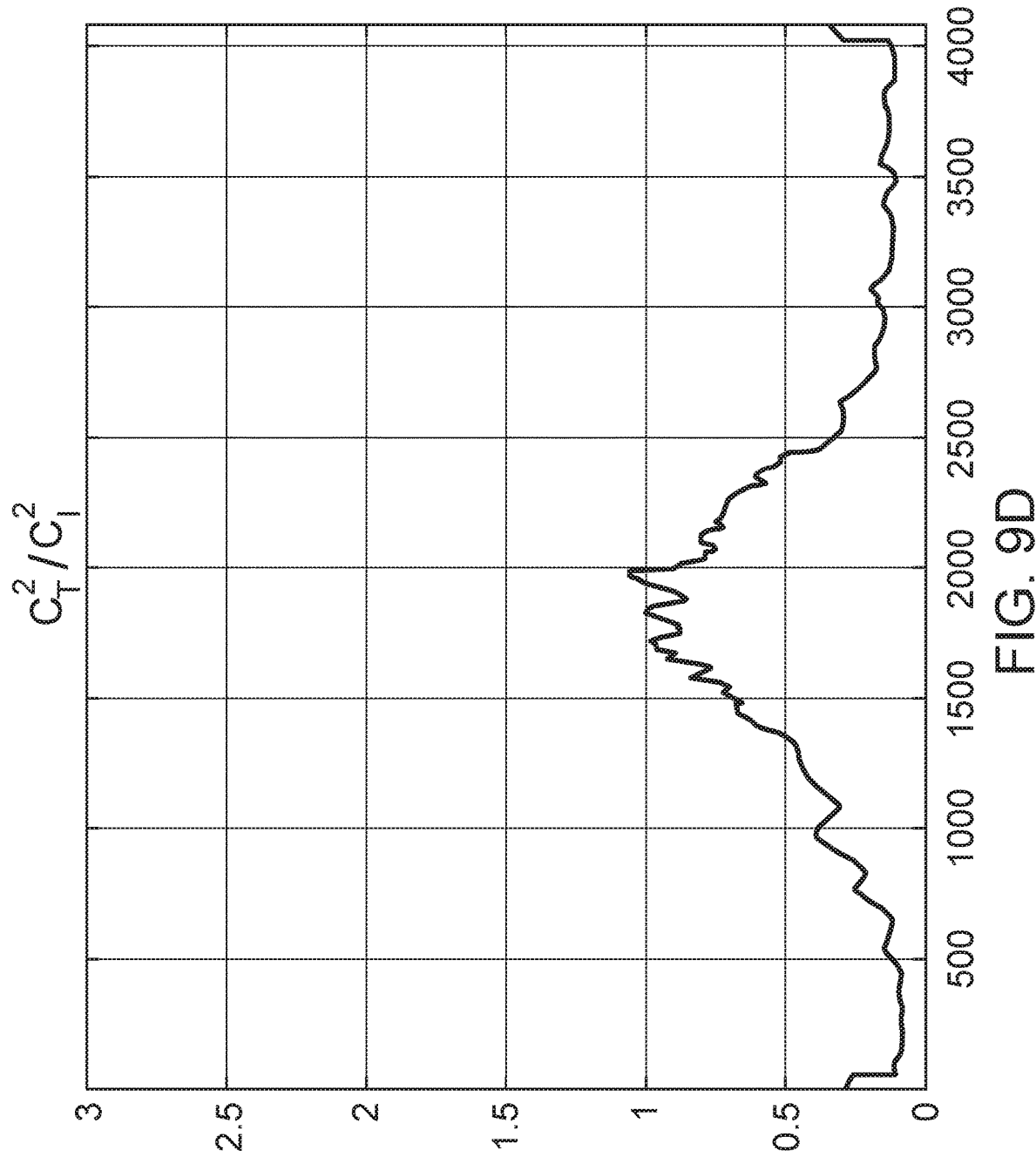

FIGS. 9B-9D illustrate the focus functions for tilted focusing sensor 30 and imaging sensor 20. The focus function may be a function of contrast within the images sensed by tilted focusing sensor 30 and imaging sensor 20. For example, $C_I$ represents the contrast function for imaging sensor 20, and $C_T$ represents the contrast function for tilted focusing sensor 30. Thus, $C_I(x)$ returns a contrast measure for an image pixel at position x along the array of imaging sensor 20, and $C_T(x)$ returns a contrast measure for an image pixel at position x along the array of tilted focusing sensor 30. In both instances, the contrast measure may be a root mean square of contrast values at x. $C_D$ represents the difference between $C_T$ and $C_I$ (e.g., $C_T$–$C_I$). Thus, $C_D(x)$ represents the difference between $C_T$ and $C_I$ at position x along the arrays of imaging sensor 20 and tilted focusing sensor 30 (e.g., $C_T(x)$–$C_I(x)$). $C_D(x)$ removes tissue-dependent spatial variations. A ratio between the contrast functions of the two images can be used as well to remove tissue-dependent spatial variations (e.g., $C_T(x)/C_I(x)$). In addition, a threshold can be defined to remove influences from background noise.

FIG. 9B illustrates the contrast function $C_I^2$ which represents contrast measures as a function of a position on imaging sensor 20. Similarly, FIG. 9C illustrates the contrast function $C_T^2$ which represents contrast measures as a function of a position on tilted focusing sensor 30. FIG. 9D illustrates a ratio of the contrast function for tilted focusing sensor 30 to the contrast function for imaging sensor 20 (i.e., $C_T^2/C_I^2$).

When tilted focusing sensor 30 and imaging sensor 20 both sense the same region of sample 120, the best focus will be at a position x on both sensors 30 and 20 at which the ratio of $C_T$ to $C_I$ (e.g., $C_T/C_I$) is 1.0. A predetermined point P on tilted focusing sensor 30 is parfocal with imaging sensor 20. This point P may be determined during system calibration.

In an embodiment, a figure-of-merit (FOM) function may be used to determine the best focus for a region of sample 120 based on data acquired by tilted focusing sensor 30. Specifically, a peak of the $C_T$ function may be determined. This $C_T$ peak will correspond to a position x on tilted focusing sensor 30 and is correlated to a focus height within the Z range of objective lens 130. Thus, when the $C_T$ peak is away from the parfocal point P on tilted focusing sensor 30 (i.e., $C_T(P)$ does not represent the peak value), a command may be initiated to move objective lens 130 in real time along an axis that is orthogonal to sample 120 (i.e., Z axis) until the peak of $C_T$ is at P (i.e., until $C_T(P)$ is the peak value for $C_T$). In other words, de-focus is characterized by the shift of the peak value of $C_T$ away from parfocal point P on tilted focusing sensor 30, and auto-focusing can be achieved via a feedback loop that moves objective lens 130 along the Z axis until the peak value of $C_T$ is at parfocal point P on tilted focusing sensor 30.

In an embodiment, an image of a field of view acquired by imaging sensor 20 is compared to an image of the same field of view acquired by focusing sensor 30 (e.g., tilted focusing sensor 30) using their ratio, difference, or other calculation.

In an embodiment, focusing sensor 30 may comprise a single line sensor or dual line sensors designed to acquire two images of the same field of view that are reversed in terms of the focal distances represented by the pixels of the images. For example, a first one of the two images has pixels representing the lowest focal distance at a first side (e.g., left side) of the captured field of view and pixels representing the highest focal distance at a second side of the captured field of view that is opposite the first side (e.g., right side), whereas the second one of the two images has pixels representing the highest focal distance at the first side (e.g., left side) of the captured field of view and pixels representing the lowest focal distance at the second side (e.g., right side) of the captured field of view. If the highest and lowest focal distances are the same for both images, then a line of pixels in the center of each image will be parfocal between the two images, and the corresponding lines of pixels emanating from the center to the sides edges (e.g., left and right edges) of the captured field of view of each image will also be parfocal between the two images but in opposite directions. For example, using left and right to arbitrarily define the edges of the images, for all distances D, a vertical line of pixels in the first image that is a distance D from the center to the left edge of the field of view represented in the first image will be parfocal with a vertical line of pixels in the second image that is a distance D from the center to the right edge of the field of view in the second image. It should be understood that, if the field of view is inverted or mirrored between the first and second images, then both images will have their highest and lowest focal distances on the same sides of the image, but on opposite sides of the field of view represented by the image.

Figure 10:
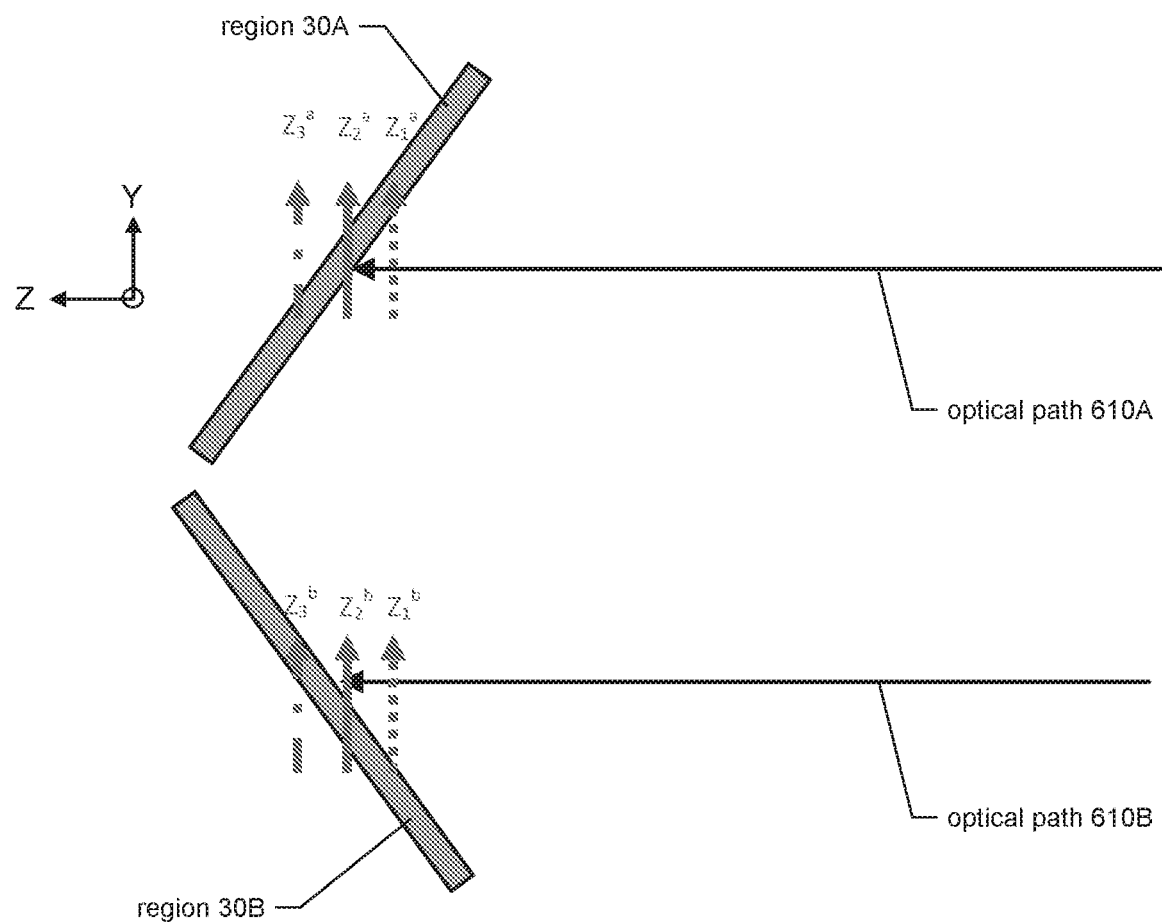
FIG. 10 illustrates an example tilted focusing sensor comprising two tilted line sensors, according to an embodiment.

FIG. 10 illustrates optical components for forming two images with reversed focal distances using two focusing sensors 30A and 30B, according to an embodiment. The tilt of focusing sensor 30A is reversed with respect to the tilt of focusing sensor 30B around the logical Z axis (i.e., the focus axis). It should be understood that the logical Z axis in FIG. 10 is not necessarily the same as the physical Z axis of objective lens 130, since the light may be bent (e.g., orthogonally by a beam splitter or prism mirror) after it passes through objective lens 130. In this embodiment, optical paths 610A and 610B provide the same optical field of view to focusing sensors 30A and 30B, but since focusing sensors 30A and 30B are reversed in terms of their tilt, the focal distances of pixels in the two images are reversed. This is illustrated by the sets of three arrows labeled $Z_1$, $Z_2$, and $Z_3$, which each represent a different sample focal height. Thus, $Z_1^a$ and $Z_1^b$ both represent a first focal height, $Z_2^a$ and $Z_2^b$ both represent a second focal height, and $Z_3^a$ and $Z_3^b$ both represent a third focal height, where each of the first, second, and third focal heights are different from each other.

Figure 11A:
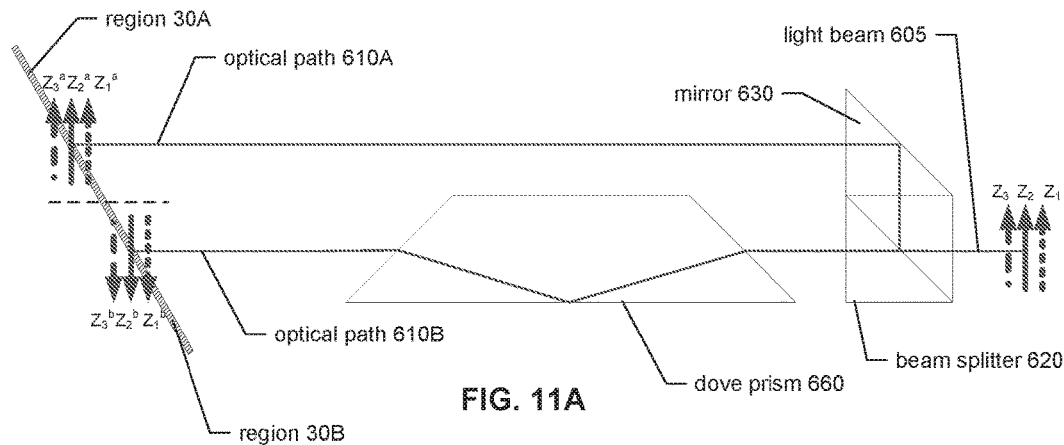
FIG. 11A is a block diagram illustrating an example tilted focusing sensor with focusing optics for acquiring reversed images, according to an embodiment.
Figure 11B:
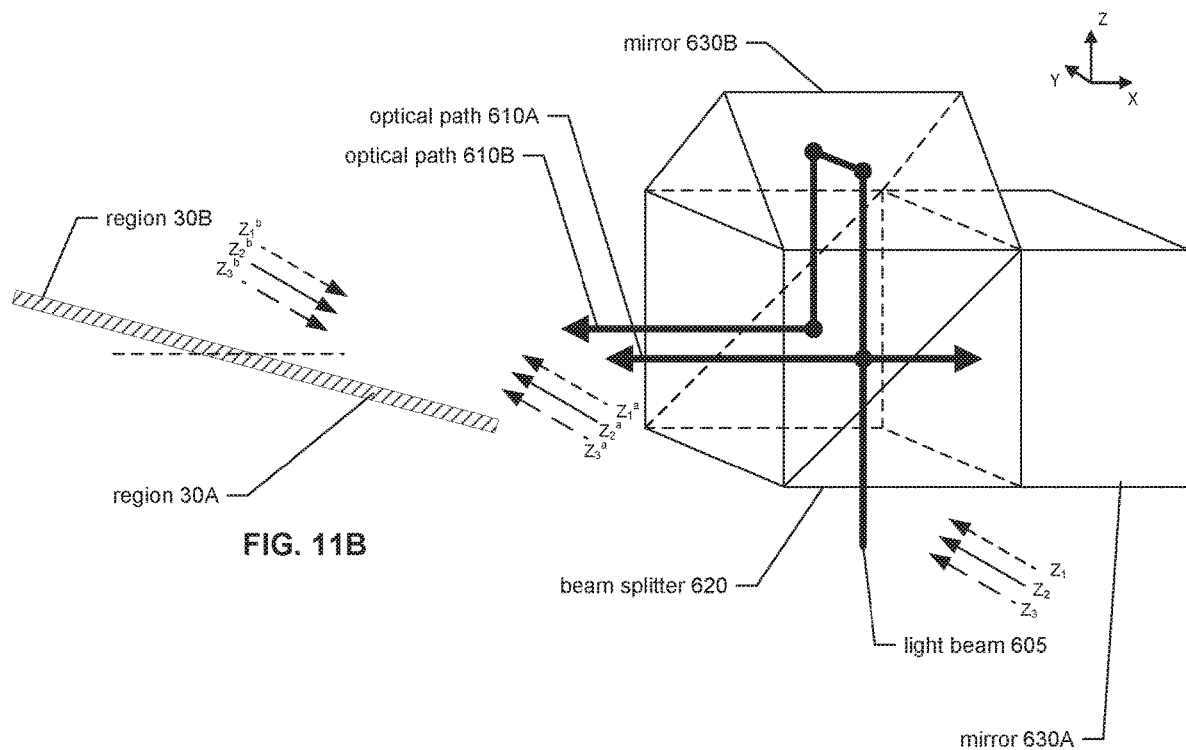
FIG. 11B is block diagram illustrating an example tilted focusing sensor with focusing optics for acquiring reversed images, according to an embodiment.

FIGS. 11A and 11B illustrate optical components for forming two mirror images on a tilted focusing sensor 30, according to two different embodiments. In the illustrated embodiments, one or more optical components may be used to form the field of view on a first region of tilted focusing sensor 30 and a reversed field of view on a second region of tilted focusing sensor 30. It should be understood that tilted focusing sensor 30 may be a single line sensor or a plurality of adjacent line sensors.

FIG. 11A illustrates optical components for forming two mirror images on a tilted focusing sensor 30, according to a first embodiment. As illustrated, a light beam 605 enters beam splitter 620 and is split into an optical path 610A, which is reflected off of mirror 630 onto a first region 30A of focusing sensor 30 such that a first image is acquired from first region 30A of focusing sensor 30, and an optical path 610B, which passes through dove prism 660. Dove prism 660 reverses light beam 605 so that a mirror image is formed on a second region 30B of focusing sensor 30 such that a second image is acquired from second region 30B of focusing sensor 30. In other words, optical path 610A provides the field of view to first region 30A of focusing sensor 30 and a mirrored field of view to second region 30B of focusing sensor 30. Thus, the second image is a mirror image of the first image around the logical Z axis. Since the angle of tilt (θ) is the same in both first region 30A and second region 30B of tilted focusing sensor 30, the fields of view depicted in the first and second images are reversed in terms of the direction of the focal distances (e.g., from highest to lowest) at which they were acquired.

FIG. 11B illustrates optical components for forming two mirror images on a tilted focusing sensor 30, according to a second embodiment. As illustrated, a light beam 605 enters beam splitter 620 and is split into an optical path 610A, which is reflected off of mirror 630A (e.g., a flat plate) to a first region 30A of tilted focusing sensor 30, and an optical path 610B. Optical path 610B reflects off of two surfaces of mirror 630B back into beam splitter 620, where it is reflected onto a second region 30B of tilted focusing sensor 30. Light beam 605 traveling on optical path 610B is reversed such that it produces an image on second region 30B of tilted focusing sensor 30 that is the mirror image of the image formed in optical path 610A on first region 30A of tilted focusing sensor 30. Since the angle of tilt (θ) is the same in both first region 30A and the second region 30B of tilted focusing sensor 30, the fields of view depicted in the first and second images are reversed in terms of the direction (e.g., from highest to lowest) of the focal distances at which they were acquired.

FIG. 12A illustrates the directionality of the focal distances for the two images acquired by regions 30A and 30B of focusing sensor 30 in the embodiments illustrated in FIGS. 10, 11A, and 11B, according to an embodiment. A comparison of these two images using a difference, a ratio, or another calculation may provide the amount of movement and direction of movement required to place objective lens 130 at a focus height on the Z axis that achieves the best focus for focusing sensor 30. In an embodiment, the center or a parfocal point of each of the region(s) of focusing sensor 30 (i.e., each region corresponding to its own separate optical path 610) is parfocal with each other, as well as with imaging sensor 20. Thus, determining a best focus for a given region of sample 120 comprises identifying a focus height for objective lens 130, such that the best foci for the two images acquired by focusing sensor 30 are at the center or a parfocal point of the respective regions of focusing sensor 30 that acquired the images. When the best foci for the regions of focusing sensor 30 are centered or parfocal in this manner, the focus height of objective lens 130 that corresponds to the centers or parfocal points of both regions is also the focus height at which imaging sensor 30 (which is parfocal with the centers of both regions of focusing sensor 30 or with a parfocal point, e.g., determined during system calibration) is at the best focus for the given region of sample 120.

FIG. 12B illustrates the focus functions for two reversed images acquired by regions 30A and 30B of focusing sensor 30. In embodiments in which a mirrored image is acquired (e.g., by region 30B in FIGS. 11A and 11B), the mirrored image is inverted by software or other means prior to operations performed with respect to the two reversed images. This inversion of the mirrored image results in the two images no longer being mirror images of each other in terms of content. In other words, the two images represent the same field of view in the same orientation. However, even though the orientation of the field of view represented by the images are the same, the directions of their focal distances are reversed. For example, after this inversion process, the content on one side of a first one of the images will have been acquired at focal distance $Z_1$, while the same content on the same side of the second one of the images will have been acquired at focal distance $Z_3$, and the content on the other side of the first image will have been acquired at focal distance $Z_3$, while the same content on the same side of the second image will have been acquired at $Z_1$. The centers of the images will both have been acquired at $Z_2$.

The focus function may be a function of contrast within the reversed images. The functions may return a contrast measure for a given position x along each region of focusing sensor 30 (e.g., regions 30A and 30B) that acquires one of the reversed images (e.g., a root mean square of contrast values at a position x). For example, $C^b$ represents the contrast measures for region 30B of focusing sensor 30 which acquired the reversed image, and $C^a$ represents the contrast measures for region 30A of focusing sensor 30 which acquired the non-reversed image. $C_2^a$ and $C_2^b$ represent the contrast measures for the middle portions of the reversed images, $C_1^a$ and $C_1^b$ represent the contrast measures for the corresponding portions of one side of the reversed images, and $C_3^a$ and $C_3^b$ represent the contrast measures for the corresponding portions of the other side of the reversed images.

If a ratio algorithm is used, $C_2^a/C_2^b$ will be close to 1.0 across the entire field of view of focusing sensor 30 when the best foci for both images are centered in their corresponding regions (e.g., regions 30A and 30B) of focusing sensor 30.

When the minimum of $C_1^a/C_1^b$ (i.e., $C_1^a/C_1^b<1.0$) is on the left side of parfocal point P, a command may be sent in a feedback loop to move objective lens 130 along the Z axis in a direction such that the minimum of $C_1^a/C_1^b$ moves towards parfocal point P. When the maximum of $C_3^a/C_3^b$ (i.e., $C_3^a/C_3^b>1.0$) is on the left side of parfocal point P, a command may be sent in a feedback loop to move objective lens 130 along the Z axis in a direction such that the maximum of $C_3^a/C_3^b$ moves towards parfocal point P. The same algorithm may be applied to the other half of the ratio data centered to parfocal point P (i.e., the right-hand side of the curve). The second set of data can be used in cases where half of the field of view contains no tissue or non-useful data, or simply for redundancy to increase a success rate.

In any of the embodiments described herein as using multiple regions of a focusing sensor 30 (e.g., the embodiments illustrated FIGS. 6-7C, 11A, and 11B), focusing sensor 30 may be a single focusing sensor comprising the multiple regions, or a plurality of focusing sensors each consisting of one of the multiple regions. Furthermore, in embodiments in which a plurality of focusing sensors are used as the regions of focusing sensor 30, each of the plurality of focusing sensors may be arranged in the same plane as each other, or in different planes from each other, depending on the particular design.

Figure 13:
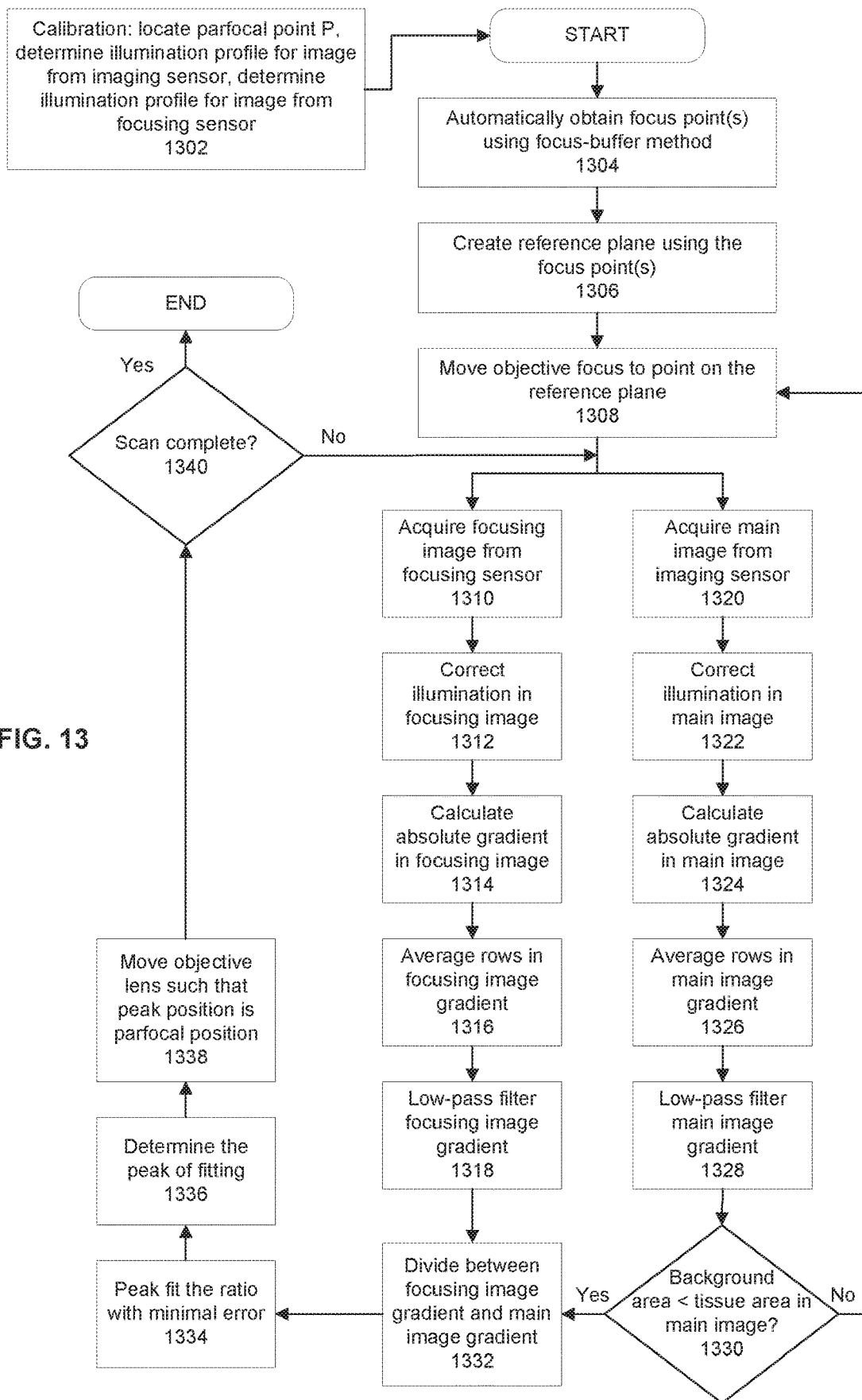
FIG. 13 is a flow diagram of a real-time focusing process, according to an embodiment.

FIG. 13 illustrates a method for real-time focusing, according to an embodiment. Initially, a calibration step 1302 may be performed. Calibration step 1302 may comprise locating a parfocal point P (e.g., parfocal with imaging sensor 20) on a tilted focusing sensor 30 (in embodiments which utilize a tilted focusing sensor), determining an illumination profile for images from imaging sensor 20, and/or determining an illumination profile for images from focusing sensor 30. It should be understood that calibration step 1302 may be performed only once for a particular system 11, or periodically for the system 11 if recalibration is needed or desired.

The real-time focusing process may begin in step 1304, in which one or more, and preferably a plurality of three or more, focus points are acquired using a focus-buffer method. Each focus point may comprise an X, Y, and Z position, where the X and Y positions represent a position in a plane of sample 120, and the Z position represents a focus height of objective lens 130. In an embodiment, each focus point is obtained by positioning objective lens 130 over an X-Y position on sample 120, sweeping objective lens 130 from one end of its height range to the other end of its height range to determine the focus height providing the best focus (e.g., peak of a contrast function) at the X-Y position.

In step 1306, a reference plane is created using the focus points obtained in step 1304. It should be understood that a reference plane can be created from as few as three focus points. When there are more than three focus points, focus points that are outliers with respect to a flat reference plane may be discarded. Otherwise, all focus points may be used to fit a reference plane. Alternatively, instead of a reference plane, a focal surface may be created from any plurality of focus points. Different embodiments for creating a reference plane or focal surface are described in U.S. patent application Ser. No. 09/563,437, filed on May 3, 2000 and issued as U.S. Pat. No. 6,711,283 on Mar. 23, 2004, and U.S. patent application Ser. No. 10/827,207, filed on Apr. 16, 2004 and issued as U.S. Pat. No. 7,518,652 on Apr. 14, 2009, the entireties of both of which are hereby incorporated herein by reference.

In step 1308, objective lens 130 is moved to a Z position defined by the reference plane as a function of the X-Y position to be scanned.

In step 1310, a focusing image is acquired from focusing sensor 30. Similarly, in step 1320, a main image is acquired from imaging sensor 20.

In step 1312, the illumination in the focusing image acquired in step 1310 is corrected using any well-known illumination-correction technique. Similarly, in step 1322, the illumination in the main image acquired in step 1320 is corrected using any well-known illumination-correction techniques. The illumination correction for the focusing image may be based on the illumination profile for focusing sensor 30 that was determined in calibration step 1302, and the illumination correction for the main image may be based on the illumination profile for imaging sensor 20 that was determined in calibration step 1302.

In step 1314, an absolute gradient of the illumination-corrected focusing image is calculated. Similarly, in step 1324, an absolute gradient of the illumination-corrected main image is calculated.

In step 1316, the rows in the focusing image gradient calculated in step 1314 are averaged. Similarly, in step 1326, the rows in the main image gradient calculated in step 1324 are averaged.

In step 1318, a low-pass filter is applied to the focusing image gradient. Similarly, in step 1328, a low-pass filter is applied to the main image gradient.

In step 1330, it is determined whether or not the background area (i.e., the area of the image without tissue) in the main image is less than the tissue area (i.e., the area of the image with tissue) in the main image. If the background area is greater than the tissue area in the main image (i.e., "No" in step 1330), the process may return to step 1308. Otherwise, if the background area is less than the tissue area in the main image (i.e., "Yes" in step 1330), the process may proceed to step 1332.

In step 1332, ratio(s) are calculated between the focusing image gradient and the main image gradient. For example, the focusing image gradient may be divided by the main image gradient.

In step 1334, a peak is fit to the ratio(s) calculated in step 1332 with minimal error. For example, a best-fit curve may be found for the ratio(s).

In step 1336, the peak of the fitting in step 1334 is determined. For example, in an embodiment in which a best-fit curve is found for the ratio(s) in step 1334, the peak of the best-fit curve may be identified in step 1336.

In step 1338, if the peak identified in step 1336 is not at the parfocal point P, objective lens 130 is moved until the peak is at the parfocal point P, for example, using a feedback loop as described elsewhere herein.

In step 1340, it is determined whether or not the scan is complete. If the scan is not complete (i.e., "No" in step 1340), the process returns to steps 1310 and 1320. Otherwise, if the scan is complete (i.e., "Yes" in step 1340), the process ends.

Figure 14A:
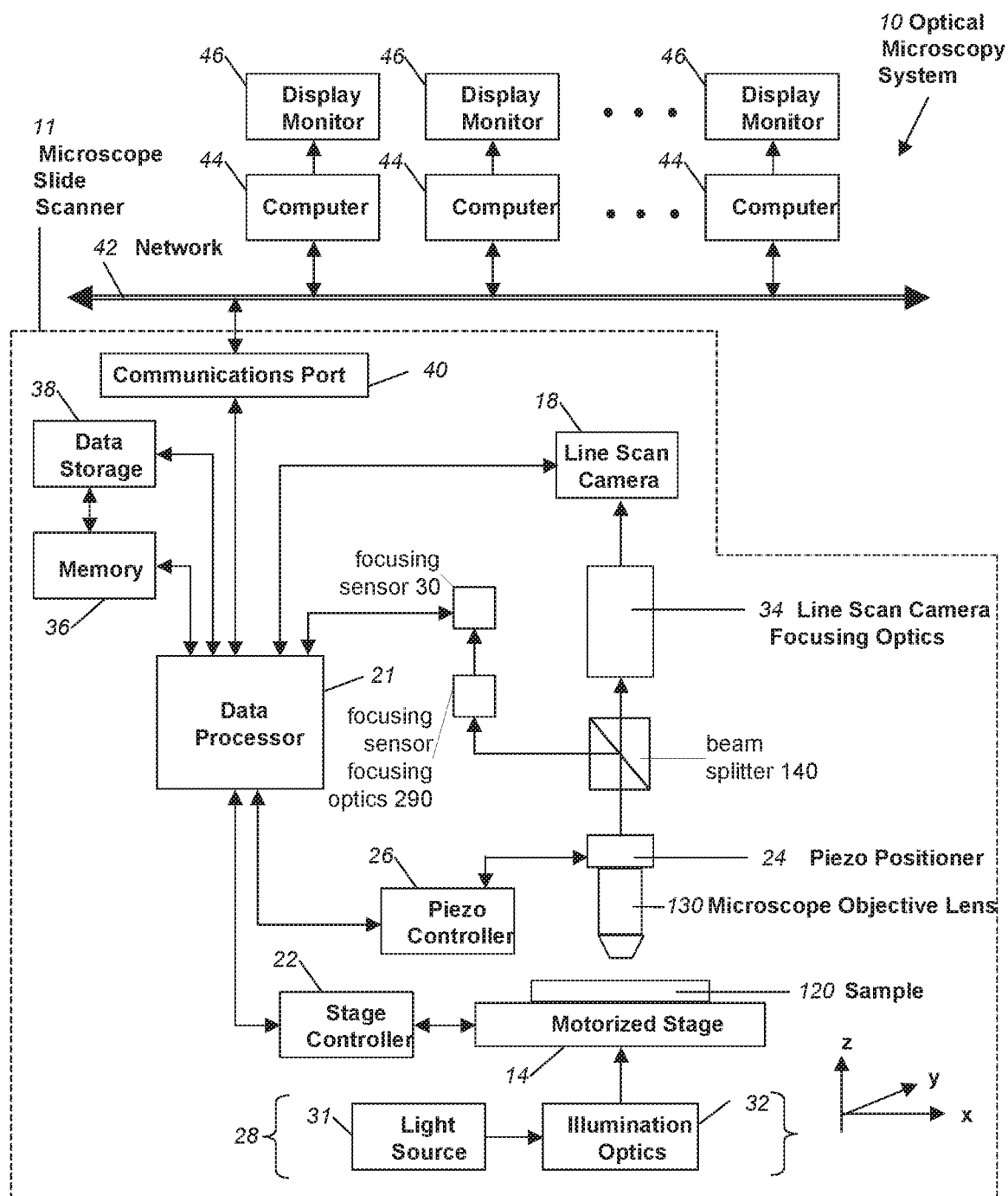
FIG. 14A is a block diagram illustrating an example microscope slide scanner, according to an embodiment.
Figure 14B:
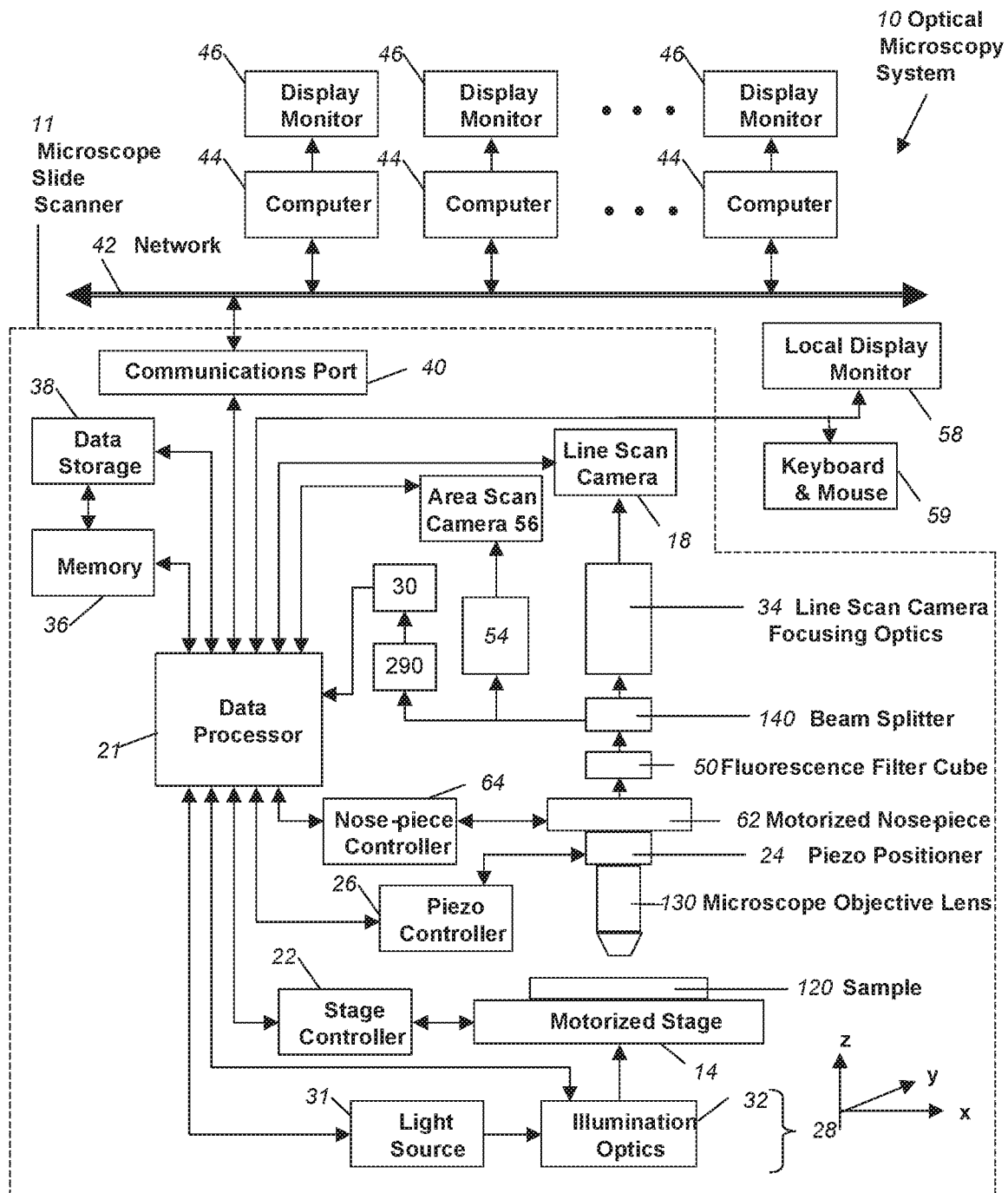
FIG. 14B is a block diagram illustrating an alternative example microscope slide scanner, according to an embodiment.
Figure 14C:
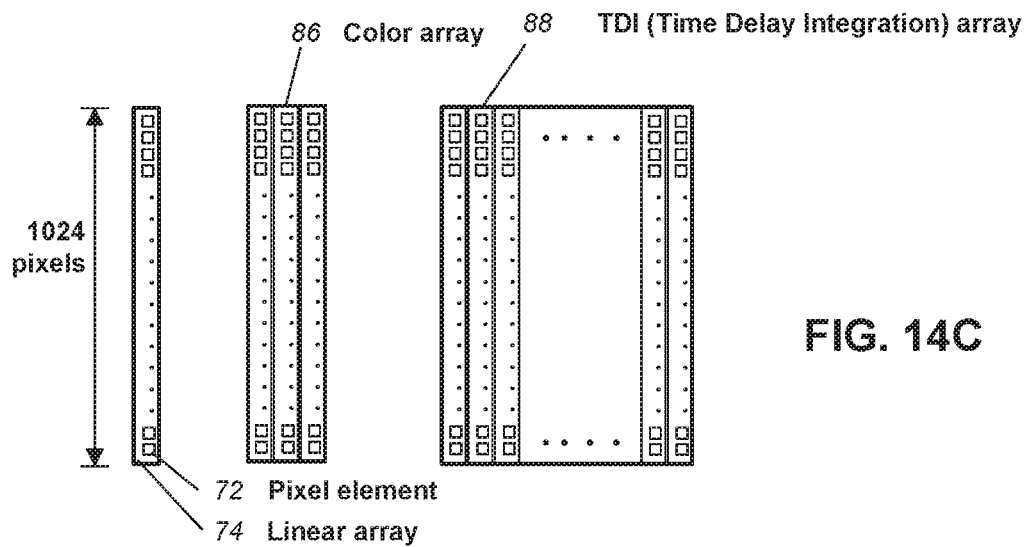
FIG. 14C is a block diagram illustrating example linear sensor arrays, according to an embodiment.

FIGS. 14A and 14B are block diagrams illustrating example microscope slide scanners, according to an embodiment, and FIG. 14C is a block diagram illustrating example linear sensor arrays, according to an embodiment. These three figures will be described in more detail below. However, they will first be described in combination to provide an overview. It should be noted that the following description is just an example of a slide scanner device and that alternative slide scanner devices can also be employed. FIGS. 14A and 14B illustrate example microscope slide scanners that can be used in conjunction with the disclosed sensor arrangement. FIG. 14C illustrates example linear sensors, which can be used in any combination as the disclosed sensors (imaging sensor 20 or focusing sensor 30).

For example, imaging sensor 20 and focusing sensor 30 may be arranged, as discussed above, using line scan camera 18 as primary imaging sensor 20. In one embodiment, line scan camera 18 may include both focusing sensor 30 and imaging sensor 20. Imaging sensor 20 and focusing sensor 30 can receive image information from a sample 120 through the microscope objective lens 130 and/or the focusing optics 34 and 290. Focusing optics 290 for focusing sensor 30 may comprise the various beam splitters 620, mirrors 630, and glass blocks 640 illustrated in FIGS. 6-8. Imaging sensor 20 and focusing sensor 30 can provide information to, and/or receive information from, data processor 21. Data processor 21 is communicatively connected to memory 36 and data storage 38. Data processor 21 may further be communicatively connected to a communications port, which may be connected by at least one network 42 to one or more computers 44, which may in turn be connected to display monitor(s) 46.

Data processor 21 may also be communicatively connected to and provide instructions to a stage controller 22, which controls a motorized stage 14 of slide scanner 11. Motorized stage 14 supports sample 120 and moves in one or more directions in the X-Y plane. In one embodiment, motorized stage 14 may also move along the Z axis. Data processor 21 may also be communicatively connected to and provide instructions to a motorized controller 26, which controls a motorized positioner 24 (e.g., a piezo positioner). Motorized positioner 24 is configured to move objective lens 130 in the Z axis. Slide scanner 11 also comprises a light source 31 and/or illumination optics 32 to illuminate sample 120, either from above or below.

FIG. 14A is a block diagram of an embodiment of an optical microscopy system 10, according to an embodiment. The heart of system 10 is a microscope slide scanner 11 that serves to scan and digitize a specimen or sample 120. Sample 120 can be anything that may be interrogated by optical microscopy. For instance, sample 120 may comprise a microscope slide or other sample type that may be interrogated by optical microscopy. A microscope slide is frequently used as a viewing substrate for specimens that include tissues and cells, chromosomes, DNA, protein, blood, bone marrow, urine, bacteria, beads, biopsy materials, or any other type of biological material or substance that is either dead or alive, stained or unstained, labeled or unlabeled. Sample 120 may also be an array of any type of DNA or DNA-related material such as cDNA or RNA or protein that is deposited on any type of slide or other substrate, including any and all samples commonly known as microarrays. Sample 120 may be a microtiter plate, for example a 96-well plate. Other examples of sample 120 include integrated circuit boards, electrophoresis records, petri dishes, film, semiconductor materials, forensic materials, or machined parts.

Scanner 11 includes a motorized stage 14, a microscope objective lens 130, a line scan camera 18, and a data processor 21. Sample 120 is positioned on motorized stage 14 for scanning. Motorized stage 14 is connected to a stage controller 22 which is connected in turn to data processor 21. Data processor 21 determines the position of sample 120 on motorized stage 14 via stage controller 22. In an embodiment, motorized stage 14 moves sample 120 in at least the two axes (x/y) that are in the plane of sample 120. Fine movements of sample 120 along the optical z-axis may also be necessary for certain applications of scanner 11, for example, for focus control. Z-axis movement may be accomplished with a piezo positioner 24, such as the PIFOC from Polytec PI or the MIPOS 3 from Piezosystem Jena. Piezo positioner 24 is attached directly to microscope objective 130 and is connected to and directed by data processor 21 via piezo controller 26. A means of providing a coarse focus adjustment may also be needed and can be provided by Z-axis movement as part of motorized stage 14 or a manual rack-and-pinion coarse focus adjustment (not shown).

In one embodiment, motorized stage 14 includes a high-precision positioning table with ball bearing linear ways to provide smooth motion and excellent straight line and flatness accuracy. For example, motorized stage 14 could include two Daedal model 106004 tables stacked one on top of the other. Other types of motorized stages 14 are also suitable for scanner 11, including stacked single-axis stages based on ways other than ball bearings, single- or multiple-axis positioning stages that are open in the center and are particularly suitable for trans-illumination from below the sample, or larger stages that can support a plurality of samples. In one embodiment, motorized stage 14 includes two stacked single-axis positioning tables, each coupled to two millimeter lead-screws and Nema-23 stepping motors. At the maximum lead screw speed of twenty-five revolutions per second, the maximum speed of sample 120 on the motorized stage 14 is fifty millimeters per second. Selection of a lead screw with larger diameter, for example five millimeters, can increase the maximum speed to more than 100 millimeters per second. Motorized stage 14 can be equipped with mechanical or optical position encoders which has the disadvantage of adding significant expense to the system. Consequently, such an embodiment does not include position encoders. However, if one were to use servo motors in place of stepping motors, then one would have to use position feedback for proper control.

Position commands from data processor 21 are converted to motor current or voltage commands in stage controller 22. In one embodiment, stage controller 22 includes a 2-axis servo/stepper motor controller (Compumotor 6K2) and two 4-amp microstepping drives (Compumotor OEMZL4). Microstepping provides a means for commanding the stepper motor in much smaller increments than the relatively large single 1.8 degree motor step. For example, at a microstep of 100, sample 120 can be commanded to move at steps as small as 0.1 micrometer. In an embodiment, a microstep of 25,000 is used. Smaller step sizes are also possible. It should be understood that the optimum selection of motorized stage 14 and stage controller 22 depends on many factors, including the nature of sample 120, the desired time for sample digitization, and the desired resolution of the resulting digital image of sample 120.

Microscope objective lens 130 can be any microscope objective lens commonly available. One of ordinary skill in the art will recognize that the choice of which objective lens to use will depend on the particular circumstances. In an embodiment, microscope objective lens 130 is of the infinity-corrected type.

Sample 120 is illuminated by an illumination system 28 that includes a light source 31 and illumination optics 32. In an embodiment, light source 31 includes a variable intensity halogen light source with a concave reflective mirror to maximize light output and a KG-1 filter to suppress heat. However, light source 31 could also be any other type of arc-lamp, laser, light emitting diode ("LED"), or other source of light. In an embodiment, illumination optics 32 include a standard Köhler illumination system with two conjugate planes that are orthogonal to the optical axis. Illumination optics 32 are representative of the bright-field illumination optics that can be found on most commercially-available compound microscopes sold by companies such as Leica, Carl Zeiss, Nikon, or Olympus. One set of conjugate planes includes (i) a field iris aperture illuminated by light source 31, (ii) the object plane that is defined by the focal plane of sample 120, and (iii) the plane containing the light-responsive elements of line scan camera 18. A second conjugate plane includes (i) the filament of the bulb that is part of light source 31, (ii) the aperture of a condenser iris that sits immediately before the condenser optics that are part of illumination optics 32, and (iii) the back focal plane of the microscope objective lens 130. In an embodiment, sample 120 is illuminated and imaged in transmission mode, with line scan camera 18 sensing optical energy that is transmitted by sample 120, or conversely, optical energy that is absorbed by sample 120.

Scanner 11 is equally suitable for detecting optical energy that is reflected from sample 120, in which case light source 31, illumination optics 32, and microscope objective lens 130 must be selected based on compatibility with reflection imaging. A possible embodiment may therefore include illumination through a fiber optic bundle that is positioned above sample 120. Other possibilities include excitation that is spectrally conditioned by a monochromator. If microscope objective lens 130 is selected to be compatible with phase-contrast microscopy, then the incorporation of at least one phase stop in the condenser optics that are part of illumination optics 32 will enable scanner 11 to be used for phase contrast microscopy. To one of ordinary skill in the art, the modifications required for other types of microscopy such as differential interference contrast and confocal microscopy should be readily apparent. Overall, scanner 11 is suitable, with appropriate but well-known modifications, for the interrogation of microscopic samples in any known mode of optical microscopy.

Between microscope objective lens 130 and line scan camera 18 are situated line scan camera focusing optics 34 that focus the optical signal captured by microscope objective lens 130 onto the light-responsive elements of line scan camera 18 (e.g., imaging sensor 20). In a modern infinity-corrected microscope, the focusing optics between the microscope objective lens and the eyepiece optics, or between the microscope objective lens and an external imaging port, comprise an optical element known as a tube lens that is part of a microscope's observation tube. Many times the tube lens consists of multiple optical elements to prevent the introduction of coma or astigmatism. One of the motivations for the relatively recent change from traditional finite tube length optics to infinity corrected optics was to increase the physical space in which the optical energy from sample 120 is parallel, meaning that the focal point of this optical energy is at infinity. In this case, accessory elements like dichroic mirrors or filters can be inserted into the infinity space without changing the optical path magnification or introducing undesirable optical artifacts.

Infinity-corrected microscope objective lenses are typically inscribed with an infinity mark. The magnification of an infinity corrected microscope objective lens is given by the quotient of the focal length of the tube lens divided by the focal length of the objective lens. For example, a tube lens with a focal length of 180 millimeters will result in 20× magnification if an objective lens with 9 millimeter focal length is used. One of the reasons that the objective lenses manufactured by different microscope manufacturers are not compatible is because of a lack of standardization in the tube lens focal length. For example, a 20× objective lens from Olympus, a company that uses a 180 millimeter tube lens focal length, will not provide a 20× magnification on a Nikon microscope that is based on a different tube length focal length of 200 millimeters. Instead, the effective magnification of such an Olympus objective lens engraved with 20× and having a 9 millimeter focal length will be 22.2×, obtained by dividing the 200 millimeter tube lens focal length by the 9 millimeter focal length of the objective lens. Changing the tube lens on a conventional microscope is virtually impossible without disassembling the microscope. The tube lens is part of a critical fixed element of the microscope. Another contributing factor to the incompatibility between the objective lenses and microscopes manufactured by different manufacturers is the design of the eyepiece optics, the binoculars through which the specimen is observed. While most of the optical corrections have been designed into the microscope objective lens, most microscope users remain convinced that there is some benefit in matching one manufacturers' binocular optics with that same manufacturers' microscope objective lenses to achieve the best visual image.

Line scan camera focusing optics 34 include a tube lens optic mounted inside of a mechanical tube. Since scanner 11, in an embodiment, lacks binoculars or eyepieces for traditional visual observation, the problem suffered by conventional microscopes of potential incompatibility between objective lenses and binoculars is immediately eliminated. One of ordinary skill will similarly realize that the problem of achieving parfocality between the eyepieces of the microscope and a digital image on a display monitor is also eliminated by virtue of not having any eyepieces. Since scanner 11 also overcomes the field of view limitation of a traditional microscope by providing a field of view that is practically limited only by the physical boundaries of sample 120, the importance of magnification in an all-digital imaging microscope such as provided by scanner 11 is limited. Once a portion of sample 120 has been digitized, it is straightforward to apply electronic magnification, sometimes known as electric zoom, to an image of sample 120 in order to increase its magnification. Increasing the magnification of an image electronically has the effect of increasing the size of that image on the monitor that is used to display the image. If too much electronic zoom is applied, then the display monitor will be able to show only portions of the magnified image. However, it is not possible to use electronic magnification to display information that was not present in the original optical signal that was digitized in the first place. Since one of the objectives of scanner 11, in an embodiment, is to provide high quality digital images, in lieu of visual observation through the eyepieces of a microscope, the content of the images acquired by scanner 11 should include as much image detail as possible. The term resolution is typically used to describe such image detail and the term diffraction-limited is used to describe the wavelength-limited maximum spatial detail available in an optical signal. Scanner 11 provides diffraction-limited digital imaging by selection of a tube lens focal length that is matched according to the well-known Nyquist sampling criteria to both the size of an individual pixel element in a light-sensing camera such as line scan camera 18 and to the numerical aperture of microscope objective lens 130. It is well known that numerical aperture, not magnification, is the resolution-limiting attribute of a microscope objective lens.

An example will help to illustrate the optimum selection of a tube lens focal length that is part of line scan camera focusing optics 34. Consider again the 20× microscope objective lens 130 with 9 millimeter focal length discussed previously, and assume that this objective lens has a numerical aperture of 0.50. Assuming no appreciable degradation from the condenser, the diffraction-limited resolving power of this objective lens at a wavelength of 500 nanometers is approximately 0.6 micrometers, obtained using the well-known Abbe relationship. Assume further that line scan camera 18, which in an embodiment has a plurality of 14 micrometer square pixels, is used to detect a portion of sample 120. In accordance with sampling theory, it is necessary that at least two sensor pixels subtend the smallest resolvable spatial feature. In this case, the tube lens must be selected to achieve a magnification of 46.7, obtained by dividing 28 micrometers, which corresponds to two 14 micrometer pixels, by 0.6 micrometers, the smallest resolvable feature dimension. The optimum tube lens optic focal length is therefore about 420 millimeters, obtained by multiplying 46.7 by 9. Line scan focusing optics 34 with a tube lens optic having a focal length of 420 millimeters will therefore be capable of acquiring images with the best possible spatial resolution, similar to what would be observed by viewing a specimen under a microscope using the same 20× objective lens. To reiterate, scanner 11 utilizes a traditional 20× microscope objective lens 130 in a higher magnification optical configuration (about 47× in the example above) in order to acquire diffraction-limited digital images. If a traditional 20× magnification objective lens 130 with a higher numerical aperture were used, say 0.75, the required tube lens optic magnification for diffraction-limited imaging would be about 615 millimeters, corresponding to an overall optical magnification of 68×. Similarly, if the numerical aperture of the 20× objective lens were only 0.3, the optimum tube lens optic magnification would only be about 28×, which corresponds to a tube lens optic focal length of approximately 252 millimeters. Line scan camera focusing optics 34 may be modular elements of scanner 11 that can be interchanged as necessary for optimum digital imaging. The advantage of diffraction-limited digital imaging is particularly significant for applications, for example bright field microscopy, in which the reduction in signal brightness that accompanies increases in magnification is readily compensated by increasing the intensity of an appropriately designed illumination system 28.

In principle, it is possible to attach external magnification-increasing optics to a conventional microscope-based digital imaging system to effectively increase the tube lens magnification so as to achieve diffraction-limited imaging as has just been described for scanner 11. However, the resulting decrease in the field of view is often unacceptable, making this approach impractical. Furthermore, many users of microscopes typically do not understand enough about the details of diffraction-limited imaging to effectively employ these techniques on their own. In practice, digital cameras are attached to microscope ports with magnification-decreasing optical couplers to attempt to increase the size of the field of view to something more similar to what can be seen through the eyepiece. The standard practice of adding de-magnifying optics is a step in the wrong direction if the goal is to obtain diffraction-limited digital images.

In a conventional microscope, different power objectives lenses are typically used to view the specimen at different resolutions and magnifications. Standard microscopes have a nosepiece that holds five objectives lenses. In an all-digital imaging system, such as scanner 11, there is a need for only one microscope objective lens 130 with a numerical aperture corresponding to the highest spatial resolution desirable. Thus, in an embodiment, scanner 11 consists of only one microscope objective lens 130. Once a diffraction-limited digital image has been captured at this resolution, it is straightforward using standard digital image processing techniques, to present imagery information at any desirable reduced resolutions and magnifications.

One embodiment of scanner 11 is based on a Dalsa SPARK line scan camera 18 with 1024 pixels (picture elements) arranged in a linear array, with each pixel having a dimension of 14 by 14 micrometers. Any other type of linear array, whether packaged as part of a camera or custom-integrated into an imaging electronic module, can also be used. The linear array in one embodiment effectively provides eight bits of quantization, but other arrays providing higher or lower level of quantization may also be used. Alternate arrays based on three-channel red-green-blue (RGB) color information or time delay integration (TDI), may also be used. TDI arrays provide a substantially better signal-to-noise ratio (SNR) in the output signal by summing intensity data from previously imaged regions of a specimen, yielding an increase in the SNR that is in proportion to the square-root of the number of integration stages. TDI arrays can comprise multiple stages of linear arrays. TDI arrays are available with 24, 32, 48, 64, 96, or even more stages. Scanner 11 also supports linear arrays that are manufactured in a variety of formats including some with 512 pixels, some with 1024 pixels, and others having as many as 4096 pixels. Appropriate, but well known, modifications to illumination system 28 and line scan camera focusing optics 34 may be required to accommodate larger arrays. Linear arrays with a variety of pixel sizes can also be used in scanner 11. The salient requirement for the selection of any type of line scan camera 18 is that sample 120 can be in motion with respect to line scan camera 18 during the digitization of sample 120, in order to obtain high quality images, overcoming the static requirements of the conventional imaging tiling approaches known in the prior art.

The output signal of line scan camera 18 is connected to data processor 21. In an embodiment, data processor 21 includes a central processing unit with ancillary electronics (e.g., a motherboard) to support at least one signal digitizing electronics board such as an imaging board or a frame grabber. In an embodiment, the imaging board is an EPIX PIXCID24 PCI bus imaging board. However, there are many other types of imaging boards or frame grabbers from a variety of manufacturers which could be used in place of the EPIX board. An alternative embodiment could be a line scan camera that uses an interface such as IEEE 1394, also known as Firewire, to bypass the imaging board altogether and store data directly on data storage 38 (e.g., a hard disk).

Data processor 21 is also connected to a memory 36, such as random access memory (RAM), for the short-term storage of data, and to data storage 38, such as a hard drive, for long-term data storage. Further, data processor 21 is connected to a communications port 40 that is connected to a network 42 such as a local area network (LAN), a wide area network (WAN), a metropolitan area network (MAN), an intranet, an extranet, or the Internet. Memory 36 and data storage 38 are also connected to each other. Data processor 21 is also capable of executing computer programs, in the form of software, to control critical elements of scanner 11 such as line scan camera 18 and stage controller 22, or for a variety of image-processing functions, image-analysis functions, or networking. Data processor 21 can be based on any operating system, including operating systems such as Windows, Linux, OS/2, Mac OS, and Unix. In an embodiment, data processor 21 operates based on the Windows NT operating system.

Data processor 21, memory 36, data storage 38, and communication port 40 are each elements that can be found in a conventional computer. One example would be a personal computer such as a Dell Dimension XPS T500 that features a Pentium III 500 MHz processor and up to 756 megabytes (MB) of RAM. In an embodiment, the computer elements which include the data processor 21, memory 36, data storage 38, and communications port 40 are all internal to scanner 11, so that the only connection of scanner 11 to the other elements of system 10 is via communication port 40. In an alternative embodiment of scanner 11, the computer elements could be external to scanner 11 with a corresponding connection between the computer elements and scanner 11.

In an embodiment, scanner 11 integrates optical microscopy, digital imaging, motorized sample positioning, computing, and network-based communications into a single-enclosure unit. The major advantage of packaging scanner 11 as a single-enclosure unit, with communications port 40 as the primary means of data input and output, are reduced complexity and increased reliability. The various elements of scanner 11 are optimized to work together, in sharp contrast to traditional microscope-based imaging systems in which the microscope, light source, motorized stage, camera, and computer are typically provided by different vendors and require substantial integration and maintenance.

Communication port 40 provides a means for rapid communications with the other elements of system 10, including network 42. One communications protocol for communications port 40 is a carrier-sense multiple-access collision detection protocol such as Ethernet, together with the TCP/IP protocol for transmission control and internetworking. Scanner 11 is intended to work with any type of transmission media, including broadband, baseband, coaxial cable, twisted pair, fiber optics, DSL, or wireless.

In one embodiment, control of scanner 11 and review of the imagery data captured by scanner 11 are performed on a computer 44 that is connected to network 42. In an embodiment, computer 44 is connected to a display monitor 46 to provide imagery information to an operator. A plurality of computers 44 may be connected to network 42. In an embodiment, computer 44 communicates with scanner 11 using a network browser such as Internet Explorer™ from Microsoft™, Chrome™ from Google™, Safari™ from Apple™, etc. Images are stored on scanner 11 in a common compressed format, such as JPEG, which is an image format that is compatible with standard image-decompression methods that are already built into most commercial browsers. Other standard or non-standard, lossy or lossless, image compression formats will also work. In one embodiment, scanner 11 is a web server providing an operator interface that is based on web pages that are sent from scanner 11 to computer 44. For dynamic review of imagery data, an embodiment of scanner 11 is based on playing back, for review on display monitor 46 that is connected to computer 44, multiple frames of imagery data using standard multiple-frame browser compatible software packages such as Media-Player™ from Microsoft™, Quicktime™ from Apple™, or RealPlayer™ from Real Networks™ In an embodiment, the browser on computer 44 uses the Hypertext Transfer Protocol (HTTP) together with TCP for transmission control.

There are, and will be in the future, many different means and protocols by which scanner 11 could communicate with computer 44, or a plurality of computers. While one embodiment is based on standard means and protocols, the approach of developing one or multiple customized software modules known as applets is equally feasible and may be desirable for selected future applications of scanner 11. Furthermore, there are no constraints that computer 44 be of any specific type such as a personal computer (PC) or be manufactured by any specific company such as Dell™. One of the advantages of a standardized communications port 40 is that any type of computer 44, operating common network browser software, can communicate with scanner 11.

If desired, it is possible, with some modifications to scanner 11, to obtain spectrally-resolved images. Spectrally-resolved images are images in which spectral information is measured at every image pixel. Spectrally-resolved images could be obtained by replacing line scan camera 18 of scanner 11 with an optical slit and an imaging spectrograph. The imaging spectrograph uses a two-dimensional CCD detector to capture wavelength-specific intensity data for a column of image pixels by using a prism or grating to disperse the optical signal that is focused on the optical slit along each of the rows of the detector.

FIG. 14B is a block diagram of a second embodiment of an optical microscopy system 10, according to an embodiment. In this system 10, scanner 11 is more complex and expensive than the embodiment shown in FIG. 14A. The additional attributes of scanner 11 that are shown do not all have to be present for any alternative embodiment to function correctly. FIG. 14B is intended to provide a reasonable example of additional features and capabilities that could be incorporated into scanner 11.

The alternative embodiment of FIG. 14B provides for a much greater level of automation than the embodiment of FIG. 14A. A more complete level of automation of illumination system 28 is achieved by connections between data processor 21 and both light source 31 and illumination optics 32 of illumination system 28. The connection to light source 31 may control the voltage, or current, in an open or closed loop fashion, in order to control the intensity of light source 31. Recall that light source 31 may be a halogen bulb. The connection between data processor 21 and illumination optics 32 could provide closed-loop control of the field iris aperture and the condenser iris to provide a means for ensuring that optimum Köhler illumination is maintained.

Use of scanner 11 for fluorescence imaging requires easily recognized modifications to light source 31, illumination optics 32, and microscope objective lens 130. The embodiment of FIG. 14B also provides for a fluorescence filter cube 50 that includes an excitation filter, a dichroic filter, and a barrier filter. Fluorescence filter cube 50 is positioned in the infinity-corrected beam path that exists between microscope objective lens 130 and line scan camera focusing optics 34. An embodiment for fluorescence imaging could include the addition of a filter wheel or tunable filter into illumination optics 32 to provide appropriate spectral excitation for the variety of fluorescent dyes or nano-crystals available on the market.

The addition of at least one beam splitter 52 into the imaging path allows the optical signal to be split into at least two paths. The primary path is via line scan camera focusing optics 34, as discussed previously, to enable diffraction-limited imaging by line scan camera 18 (which may include imaging sensor 20). A second path is provided via an area scan camera focusing optics 54 for imaging by an area scan camera 56. It should be readily apparent that proper selection of these two focusing optics can ensure diffraction-limited imaging by the two camera sensors having different pixel sizes. Area scan camera 56 can be one of many types that are currently available, including a simple color video camera, a high performance, cooled, CCD camera, or a variable integration-time fast frame camera. Area scan camera 56 provides a traditional imaging system configuration for scanner 11. Area scan camera 56 is connected to data processor 21. If two cameras are used, for example line scan camera 18 and area scan camera 56, both camera types could be connected to the data processor using either a single dual-purpose imaging board, two different imaging boards, or the IEEE1394 Firewire interface, in which case one or both imaging boards may not be needed. Other related methods of interfacing imaging sensors to data processor 21 are also available.

While the primary interface of scanner 11 to computer 44 is via network 42, there may be instances, for example a failure of network 42, where it is beneficial to be able to connect scanner 11 directly to a local output device such as display monitor 58 and to also provide local input devices such as a keyboard and mouse 59 that are connected directly into data processor 21 of scanner 11. In this instance, the appropriate driver software and hardware would have to be provided as well.

The second embodiment shown in FIG. 14B also provides for a much greater level of automated imaging performance. Enhanced automation of the imaging of scanner 11 can be achieved by closing the focus-control loop comprising piezo positioner 24, piezo controller 26, and data processor 21 using well-known methods of autofocus. The second embodiment also provides for a motorized nose-piece 62 to accommodate several objectives lenses. The motorized nose-piece 62 is connected to and directed by data processor 21 through a nose-piece controller 64.

There are other features and capabilities of scanner 11 which could be incorporated. For example, the process of scanning sample 120 with respect to microscope objective lens 130 that is substantially stationary in the X-Y plane of sample 120 could be modified to comprise scanning of microscope objective lens 130 with respect to a stationary sample 120 (i.e., moving microscope objective lens 130 in an X-Y plane). Scanning sample 120, or scanning microscope objective lens 130, or scanning both sample 120 and microscope objective lens 130 simultaneously, are possible embodiments of scanner 11 which can provide the same large contiguous digital image of sample 120 as discussed previously.

Scanner 11 also provides a general purpose platform for automating many types of microscope-based analyses. Illumination system 28 could be modified from a traditional halogen lamp or arc-lamp to a laser-based illumination system to permit scanning of sample 120 with laser excitation. Modifications, including the incorporation of a photo-multiplier tube or other non-imaging detector, in addition to or in lieu of line scan camera 18 or area scan camera 56, could be used to provide a means of detecting the optical signal resulting from the interaction of the laser energy with sample 120.

Turning now to FIG. 14C, line scan camera field of view 250 comprises the region of sample 120 of FIG. 14A that is imaged by a multitude of individual pixel elements 72 that are arranged in a linear fashion into a linear array 74. Linear array 74 of an embodiment comprises 1024 of the individual pixel elements 72, with each of pixel elements 72 being 14 micrometers square. In an embodiment, the physical dimensions of linear array 74 are 14.34 millimeters by 14 micrometers. Assuming, for purposes of discussion of the operation of the scanner 11, that the magnification between sample 120 and line scan camera 18 is ten, then line scan camera field of view 250 corresponds to a region of sample 120 that has dimensions equal to 1.43 millimeters by 1.4 micrometers. Each pixel element 72 images an area about 1.4 micrometers by 1.4 micrometers.

In one embodiment of scanner 11, the scanning and digitization is performed in a direction of travel that alternates between image strips. This type of bi-directional scanning provides for a more rapid digitization process than uni-directional scanning, a method of scanning and digitization which requires the same direction of travel for each image strip.

The capabilities of line scan camera 18 (e.g., comprising imaging sensor 20) and focusing sensor 30 typically determine whether scanning and focusing can be done bi-directionally or uni-directionally. Uni-directional systems often comprise more than one linear array 74, such as a three channel color array 86 or a multi-channel TDI array 88 shown in FIG. 14C. Color array 86 detects the RGB intensities required for obtaining a color image. An alternative embodiment for obtaining color information uses a prism to split the broadband optical signal into the three color channels. TDI array 88 could be used in an alternate embodiment of scanner 11 to provide a means of increasing the effective integration time of line scan camera 18, while maintaining a fast data rate, and without significant loss in the signal-to-noise ratio of the digital imagery data.

Figure 15:
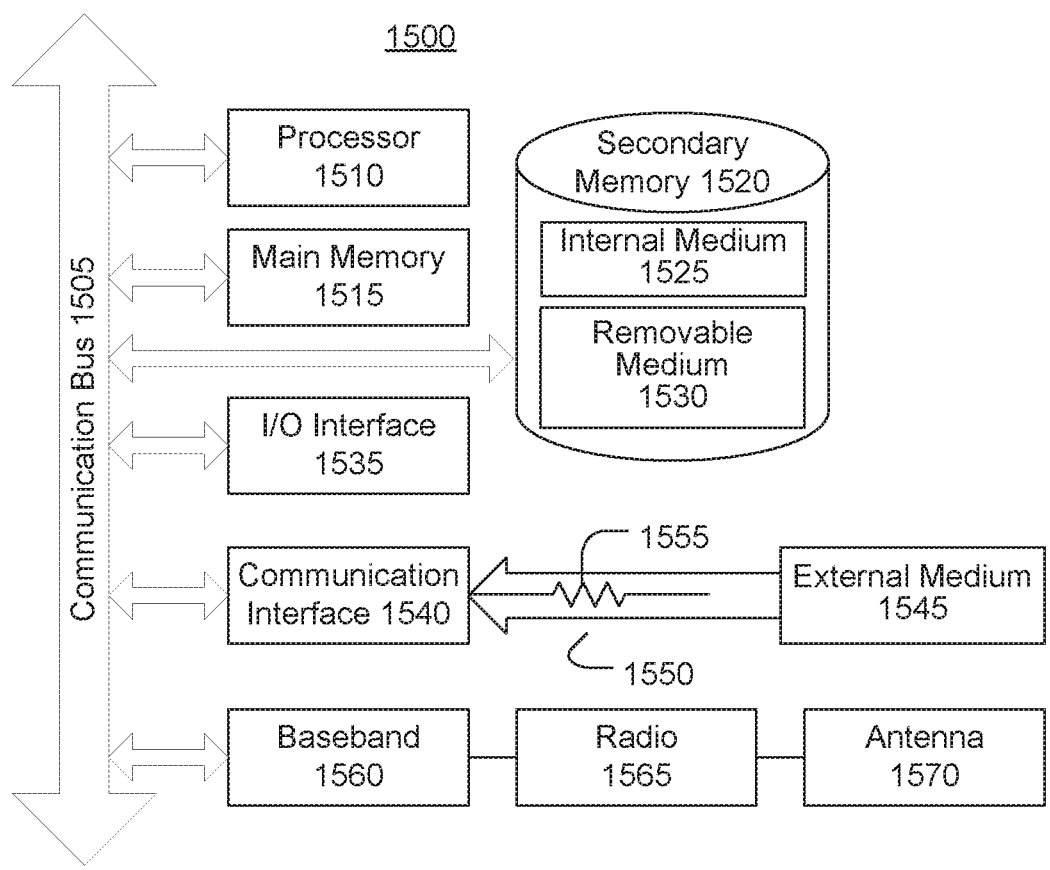
FIG. 15 is a block diagram illustrating an example wired or wireless processor-enabled device that may be used in connection with various embodiments described herein.

FIG. 15 is a block diagram illustrating an example wired or wireless system 1500 that may be used in connection with various embodiments described herein. For example system 1500 may be used as or in conjunction with one or more of the mechanisms, processes, methods, or functions described above, and may represent components of slide scanner 11, such as data processor 21. System 1500 can be any processor-enabled device that is capable of wired or wireless data communication. Other computer systems and/or architectures may be also used, as will be clear to those skilled in the art.

System 1500 preferably includes one or more processors, such as processor 1510. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 1510. Examples of processors which may be used with system 1500 include, without limitation, the Pentium® processor, Core i7® processor, and Xeon® processor, all of which are available from Intel Corporation of Santa Clara, Calif.

Processor 1510 is preferably connected to a communication bus 1505. Communication bus 1505 may include a data channel for facilitating information transfer between storage and other peripheral components of system 1500. Communication bus 1505 further may provide a set of signals used for communication with processor 1510, including a data bus, address bus, and control bus (not shown). Communication bus 1505 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, or standards promulgated by the Institute of Electrical and Electronics Engineers (IEEE)

including IEEE 488 general-purpose interface bus (GPIB), IEEE 696/S-100, and the like.

System 1500 preferably includes a main memory 1515 and may also include a secondary memory 1520. Main memory 1515 provides storage of instructions and data for programs executing on processor 1510, such as one or more of the functions and/or modules discussed above. It should be understood that programs stored in the memory and executed by processor 1510 may be written and/or compiled according to any suitable language, including without limitation C/C++, Java, JavaScript, Perl, Visual Basic, .NET, and the like. Main memory 1515 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary memory 1520 may optionally include an internal memory 1525 and/or a removable medium 1530. Removable medium 1530 is read from and/or written to in any well-known manner. Removable storage medium 1530 may be, for example, a magnetic tape drive, a compact disc (CD) drive, a digital versatile disc (DVD) drive, other optical drive, a flash memory drive, etc.

Removable storage medium 1530 is a non-transitory computer-readable medium having stored thereon computer-executable code (i.e., software) and/or data. The computer software or data stored on removable storage medium 1530 is read into system 1500 for execution by processor 1510.

In alternative embodiments, secondary memory 1520 may include other similar means for allowing computer programs or other data or instructions to be loaded into system 1500. Such means may include, for example, an external storage medium 1545 and a communication interface 1540 (e.g., communication port 40), which allows software and data to be transferred from external storage medium 1545 to system 1500. Examples of external storage medium 1545 may include an external hard disk drive, an external optical drive, an external magneto-optical drive, etc. Other examples of secondary memory 1520 may include semiconductor-based memory such as programmable read-only memory (PROM), erasable programmable read-only memory (EPROM), electrically erasable read-only memory (EEPROM), or flash memory (block-oriented memory similar to EEPROM).

As mentioned above, system 1500 may include a communication interface 1540. Communication interface 1540 allows software and data to be transferred between system 1500 and external devices (e.g. printers), networks, or other information sources. For example, computer software or executable code may be transferred to system 1500 from a network server via communication interface 1540. Examples of communication interface 1540 include a built-in network adapter, network interface card (NIC), Personal Computer Memory Card International Association (PCM-CIA) network card, card bus network adapter, wireless network adapter, Universal Serial Bus (USB) network adapter, modem, a network interface card (NIC), a wireless data card, a communications port, an infrared interface, an IEEE 1394 fire-wire, or any other device capable of interfacing system 550 with a network or another computing device. Communication interface 1540 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 1540 are generally in the form of electrical communication signals 1555. These signals 1555 may be provided to communication interface 1540 via a communication channel 1550. In an embodiment, communication channel 1550 may be a wired or wireless network, or any variety of other communication links. Communication channel 1550 carries signals 1555 and can be implemented using a variety of wired or wireless communication means including wire or cable, fiber optics, conventional phone line, cellular phone link, wireless data communication link, radio frequency ("RF") link, or infrared link, just to name a few.

Computer-executable code (i.e., computer programs or software) is stored in main memory 1515 and/or the secondary memory 1520. Computer programs can also be received via communication interface 1540 and stored in main memory 1515 and/or secondary memory 1520. Such computer programs, when executed, enable system 1500 to perform the various functions of the disclosed embodiments as described elsewhere herein.

In this description, the term "computer-readable medium" is used to refer to any non-transitory computer-readable storage media used to provide computer-executable code (e.g., software and computer programs) to system 1500. Examples of such media include main memory 1515, secondary memory 1520 (including internal memory 1525, removable medium 1530, and external storage medium 1545), and any peripheral device communicatively coupled with communication interface 1540 (including a network information server or other network device). These non-transitory computer-readable mediums are means for providing executable code, programming instructions, and software to system 1500.

In an embodiment that is implemented using software, the software may be stored on a computer-readable medium and loaded into system 1500 by way of removable medium 1530, I/O interface 1535, or communication interface 1540. In such an embodiment, the software is loaded into system 1500 in the form of electrical communication signals 1555. The software, when executed by processor 1510, preferably causes processor 1510 to perform the features and functions described elsewhere herein.

In an embodiment, I/O interface 1535 provides an interface between one or more components of system 1500 and one or more input and/or output devices. Example input devices include, without limitation, keyboards, touch screens or other touch-sensitive devices, biometric sensing devices, computer mice, trackballs, pen-based pointing devices, and the like. Examples of output devices include, without limitation, cathode ray tubes (CRTs), plasma displays, light-emitting diode (LED) displays, liquid crystal displays (LCDs), printers, vacuum florescent displays (VFDs), surface-conduction electron-emitter displays (SEDs), field emission displays (FEDs), and the like.

System 1500 also includes optional wireless communication components that facilitate wireless communication over a voice network and/or a data network. The wireless communication components comprise an antenna system 1570, a radio system 1565, and a baseband system 1560. In system 1500, radio frequency (RF) signals are transmitted and received over the air by antenna system 1570 under the management of radio system 1565.

In one embodiment, antenna system 1570 may comprise one or more antennae and one or more multiplexors (not shown) that perform a switching function to provide antenna system 1570 with transmit and receive signal paths. In the receive path, received RF signals can be coupled from a multiplexor to a low noise amplifier (not shown) that amplifies the received RF signal and sends the amplified signal to radio system 1565.

In alternative embodiments, radio system 1565 may comprise one or more radios that are configured to communicate over various frequencies. In an embodiment, radio system 1565 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 1565 to baseband system 1560.

If the received signal contains audio information, then baseband system 1560 decodes the signal and converts it to an analog signal. Then the signal is amplified and sent to a speaker. Baseband system 1560 also receives analog audio signals from a microphone. These analog audio signals are converted to digital signals and encoded by baseband system 1560. Baseband system 1560 also codes the digital signals for transmission and generates a baseband transmit audio signal that is routed to the modulator portion of radio system 1565. The modulator mixes the baseband transmit audio signal with an RF carrier signal generating an RF transmit signal that is routed to antenna system 1570 and may pass through a power amplifier (not shown). The power amplifier amplifies the RF transmit signal and routes it to antenna system 1570 where the signal is switched to the antenna port for transmission.

Baseband system 1560 is also communicatively coupled with processor 1510, which may be a central processing unit (CPU). Processor 1510 has access to data storage areas 1515 and 1520. Processor 1510 is preferably configured to execute instructions (i.e., computer programs or software) that can be stored in main memory 1515 or secondary memory 1520. Computer programs can also be received from baseband processor 1560 and stored in main memory 1510 or in secondary memory 1520, or executed upon receipt. Such computer programs, when executed, enable system 1500 to perform the various functions of the disclosed embodiments. For example, data storage areas 1515 or 1520 may include various software modules.

Those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit, or step is for ease of description. Specific functions or steps can be moved from one module, block, or circuit to another without departing from the invention.

Any of the software components described herein may take a variety of forms. For example, a component may be a stand-alone software package, or it may be a software package incorporated as a "tool" in a larger software product. It may be downloadable from a network, for example, a website, as a stand-alone product or as an add-in package for installation in an existing software application. It may also be available as a client-server software application, as a web-enabled software application, and/or as a mobile application.

The above description of the disclosed embodiments is provided to enable any person skilled in the art to make or use the subject matter of the present application. Various modifications to these embodiments will be readily apparent to those skilled in the art, and the general principles described herein can be applied to other embodiments without departing from the spirit or scope of the present application. Thus, it is to be understood that the description and drawings presented herein represent a presently preferred embodiment and are therefore representative of the subject matter which is broadly contemplated by the present application. It is further understood that the scope of the present application fully encompasses other embodiments that may become obvious to those skilled in the art and that the scope of the present application is accordingly not limited.

What is claimed is:

1. A system for scanning a sample to acquire a digital image of the sample, the system comprising:
   a stage configured to support a sample;
   an objective lens having a single optical axis that is orthogonal to the stage;
   an imaging sensor;
   a focusing sensor, wherein one point on the focusing sensor is parfocal with the imaging sensor;
   at least one first beam splitter optically coupled to the objective lens and configured to receive a field of view corresponding to the optical axis of the objective lens, and simultaneously provide at least a first portion of the field of view to the imaging sensor and at least a second portion of the field of view to the focusing sensor, wherein the first portion of the field of view is a first region of the field of view, and wherein the second portion of the field of view is a second region of the field of view that is offset from the first region of the field of view; and
   at least one processor configured to, for each portion of the sample to be scanned,
      acquire a focusing image of the portion of the sample from the focusing sensor,
      acquire a main image of the portion of the sample from the imaging sensor,
      for each of a plurality of positions on the focusing sensor, calculate a contrast measure for a region of the focusing image corresponding to that position on the focusing sensor,
      for each of a plurality of positions on the imaging sensor, calculate a contrast measure for a region of the main image corresponding to that position on the imaging sensor,
      determine a relationship between the focusing image and the main image,
      determine a peak for the relationship, update a target surface based upon a distance between a location on the focusing sensor corresponding to the peak and a parfocal point between the focusing sensor and the imaging sensor, and determine a position for the objective lens that provides the peak for the relationship using a feedback loop to move the objective lens until the peak is on the updated target surface, wherein a direction of movement of the objective lens using the feedback loop is based on a relationship between the focusing image and a mirror image of the focusing image, wherein the focusing image comprises pixels acquired at decreasing focal distances in a direction from a first side of the focusing image to a second side of the focusing image, wherein the mirror image of the focusing image comprises pixels acquired at decreasing focal distances in a same direction as the focusing image, and wherein the relationship between the focusing image and the mirror image of the focusing image comprises either a ratio between a contrast measure of the focusing image and a contrast measure of the mirror image of the focusing image or a difference between a contrast measure of the focusing image and a contrast measure of the mirror image of the focusing image.

2. The system of claim 1, wherein the focusing sensor receives the second portion of the field of view along an optical path, wherein the focusing sensor is tilted at an angle with respect to the optical path, such that the second portion of the field of view is acquired, by the focusing sensor, as an image comprising pixels representing different focal distances.

3. The system of claim 1, wherein the focusing sensor comprises a plurality of regions, wherein each region of the focusing sensor receives the second portion of the field of view along a separate optical path, wherein the focusing sensor is tilted at an angle with respect to each of the separate optical paths, such that the second portion of the field of view is acquired, by each region of the focusing sensor, at a different focal distance than the other regions of the focusing sensor, and wherein at least one point on one of the plurality of regions is parfocal with the imaging sensor.

4. The system of claim 3, further comprising focusing optics, wherein the focusing optics comprise a plurality of second beam splitters that are optically coupled to the at least one first beam splitter and split a beam, conveying the second portion of the field of view, into the separate optical paths, and wherein the focusing optics further comprise at least one mirror that reflects the split beam into one of the separate optical paths.

5. The system of claim 3, wherein all regions of the focusing sensor are within a single line sensor.

6. The system of claim 1, wherein the focusing sensor comprises a plurality of regions, wherein each region of the focusing sensor receives the second portion of the field of view along a separate optical path, wherein the focusing sensor is orthogonal with respect to each of the separate optical paths, wherein each of the separate optical paths has a different focus distance, such that the second portion of the field of view is acquired, by each region of focusing sensor, at a different focal distance than the other regions of focusing sensor, and wherein at least one point on one of the plurality of regions is parfocal with the imaging sensor.

7. The system of claim 1, wherein the focusing sensor comprises a first portion and a second portion, wherein the first portion of the focusing sensor receives the second portion of the field of view along a first optical path and is tilted at a first angle with respect to the first optical path, wherein the second portion of the focusing sensor receives the second portion of the field of view along a second optical path, that is separate from the first optical path, and is tilted at a second angle with respect to the second optical path that is reverse to the first angle, wherein at least one point on both the first portion of the focusing sensor and the second portion of the focusing sensor is parfocal with the imaging sensor, and wherein the first portion of the focusing sensor acquires a first image, wherein the second portion of the focusing sensor acquires a second image, wherein the first image comprises pixels acquired at decreasing focal distances in a direction from a first side of the first image to a second side of the first image, and wherein the second image comprises pixels acquired at increasing focal distances in a direction from the first side of the second image to the second side of the second image.

8. The system of claim 1, wherein the focusing sensor comprises a first region and a second region, wherein the first region receives the second portion of the field of view along a first optical path, wherein the second region receives a mirrored second portion of the field of view along a second optical path, wherein the focusing sensor is tilted at an angle with respect to each of the first optical path and the second optical path, wherein at least one point on both the first region of the focusing sensor and the second region of the focusing sensor is parfocal with the imaging sensor, wherein the second portion of the field of view is received by the first region of the focusing sensor at a focal distance, and the mirrored second portion of the field of view is received by the second region of the focusing sensor at the same focal distance, wherein the first region of the focusing sensor acquires a first image of the second portion of the field of view, wherein the second region of the focusing sensor acquires a second image of the mirrored second portion of the field of view, wherein the first image comprises pixels acquired at decreasing focal distances in a direction from a first side of the first image to a second side of the first image, and wherein the second image comprises pixels acquired at decreasing focal distances in a same direction as the first image.

9. A system for scanning a sample to acquire a digital image of the sample, the system comprising:
   a stage configured to support a sample;
   an objective lens having a single optical axis that is orthogonal to the stage;
   an imaging sensor;
   a focusing sensor, wherein one point on the focusing sensor is parfocal with the imaging sensor;
   at least one first beam splitter optically coupled to the objective lens and configured to receive a field of view corresponding to the optical axis of the objective lens, and simultaneously provide at least a first portion of the field of view to the imaging sensor and at least a second portion of the field of view to the focusing sensor, wherein the first portion of the field of view is a first region of the field of view, and wherein the second portion of the field of view is a second region of the field of view that is offset from the first region of the field of view; and
   focusing optics,
   wherein the focusing sensor comprises a first region and a second region, wherein the first region receives the second portion of the field of view along a first optical path, wherein the second region receives a mirrored second portion of the field of view along a second optical path, wherein the focusing sensor is tilted at an angle with respect to each of the first optical path and the second optical path, wherein at least one point on both the first region of the focusing sensor and the second region of the focusing sensor is parfocal with the imaging sensor, wherein the second portion of the field of view is received by the first region of the focusing sensor at a focal distance, and the mirrored second portion of the field of view is received by the second region of the focusing sensor at the same focal distance, wherein the first region of the focusing sensor acquires a first image of the second portion of the field of view, wherein the second region of the focusing sensor acquires a second image of the mirrored second portion of the field of view, wherein the first image comprises pixels acquired at decreasing focal distances in a direction from a first side of the first image to a second side of the first image, and wherein the second image comprises pixels acquired at decreasing focal distances in a same direction as the first image, and wherein the focusing optics comprise at least one second beam splitter that is optically coupled to the at least one first beam splitter and splits a beam, conveying the second portion of the field of view into the first optical path and the second optical path, wherein the focusing optics further comprise at least one mirror that reflects the split beam in one of the first optical path and the second optical path, wherein the focusing optics further comprise a dove prism in the second optical path, between the at least one first beam splitter and the second region of the focusing sensor, that flips the second portion of the field of view to form the mirrored second portion of the field of view, wherein the at least one mirror comprises a first mirror and a second mirror, and wherein the second optical path comprises a reflection from the first mirror onto the second mirror, a reflection from the second mirror back to the at least one second beam splitter, and a path from the at least one second beam splitter to the second region of the focusing sensor, such that the second portion of the field of view is flipped to form the mirrored second portion of the field of view.

10. The system of claim 1, wherein the one parfocal point is at a center of the focusing sensor.

11. The system of claim 9, further comprising a processor configured to, for each portion of the sample to be scanned:
acquire a focusing image of the portion of the sample from the focusing sensor;
acquire a main image of the portion of the sample from the imaging sensor;
for each of a plurality of positions on the focusing sensor, calculate a contrast measure for a region of the focusing image corresponding to that position on the focusing sensor;
for each of a plurality of positions on the imaging sensor, calculate a contrast measure for a region of the main image corresponding to that position on the imaging sensor;
determine a relationship between the focusing image and the main image;
determine a peak for the relationship;
update a target surface based upon a distance between a location on the focusing sensor corresponding to the peak and a parfocal point between the focusing sensor and the imaging sensor; and
determine a position for the objective lens that moves to a next target surface.

12. The system of claim 11, wherein the processor is further configured to:
move the objective lens to the determined position;
acquire a new focusing image and main image for a next portion of the sample to be scanned; and,
for each portion of the sample to be scanned, determine a relationship between the focusing image and the main image.

13. The system of claim 12, wherein the relationship between the focusing image and the main image comprises a ratio between a contrast measure of the focusing image and a contrast measure of the main image.

14. The system of claim 12, wherein the relationship between the focusing image and the main image comprises a difference between a contrast measure of the focusing image and a contrast measure of the main image.

15. The system of claim 11, wherein determining a peak for the relationship comprises:
calculating a best-fit curve for the relationship; and
determining a peak of the best-fit curve.

16. The system of claim 11, wherein each of the plurality of positions on the focusing sensor is mapped to a position for the objective lens, and wherein determining a position for the objective lens comprises determining a position for the objective lens that is mapped to a position on the focusing sensor corresponding to the determined peak.

17. The system of claim 11, wherein determining a position for the objective lens that provides the peak for the relationship comprises using a feedback loop to move the objective lens until the peak is on the updated target surface.

18. The system of claim 17, wherein a direction of movement of the objective lens using the feedback loop is based on a relationship between the first image and the second image.

19. The system of claim 18, wherein the relationship between the first image and the second image comprises a ratio between a contrast measure of the first image and a contrast measure of the second image.

20. The system of claim 18, wherein the relationship between the first image and the second image comprises a difference between a contrast measure of the first image and a contrast measure of the second image.

* * * * *